US011945238B2

(12) United States Patent
Saka et al.

(10) Patent No.: US 11,945,238 B2
(45) Date of Patent: Apr. 2, 2024

(54) LIQUID EJECTING DEVICE

(71) Applicant: SEIKO EPSON CORPORATION, Tokyo (JP)

(72) Inventors: Yoshihisa Saka, Shiojiri (JP); Tetsuji Yatsunami, Okaya (JP); Yoshikane Tsuchihashi, Matsumoto (JP); Yoshinori Yanagisawa, Shiojiri (JP); Kohei Usuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 17/645,573

(22) Filed: Dec. 22, 2021

(65) Prior Publication Data

US 2022/0203734 A1 Jun. 30, 2022

(30) Foreign Application Priority Data

Dec. 25, 2020 (JP) ................................ 2020-216420
Sep. 2, 2021 (JP) ................................ 2021-143077

(51) Int. Cl.
*B41J 29/377* (2006.01)
*B41J 2/165* (2006.01)
*B41J 29/38* (2006.01)

(52) U.S. Cl.
CPC ......... *B41J 29/377* (2013.01); *B41J 2/16588* (2013.01); *B41J 29/38* (2013.01)

(58) Field of Classification Search
CPC ...... B41J 2/1408; B41J 2/3358; B41J 29/377; B41J 2202/08; B41J 2/16588
See application file for complete search history.

(56) References Cited

U.S. PATENT DOCUMENTS

| | | | | |
|---|---|---|---|---|
| 2016/0031244 A1* | 2/2016 | Miller | ........................ B41J 2/01 347/20 |
| 2016/0243857 A1 | 8/2016 | Otsuka et al. | |
| 2017/0313109 A1* | 11/2017 | Profaca | .................... B41J 25/34 |
| 2017/0341374 A1* | 11/2017 | Nishiyama | ........... B41J 2/16535 |
| 2019/0160745 A1* | 5/2019 | Alejandre | ............. B29C 64/209 |

FOREIGN PATENT DOCUMENTS

| | | | | |
|---|---|---|---|---|
| CN | 106864034 A * | 6/2017 | ................ B41J 2/01 |
| CN | 107020844 A * | 8/2017 | .......... B41J 2/04515 |
| JP | 2003-249070 | 9/2003 | |
| JP | 2010-280119 | 12/2010 | |
| JP | 2016-150490 A | 8/2016 | |
| JP | 2019-124778 | 7/2019 | |
| JP | 2020066157 A * | 4/2020 | ................ B41J 2/01 |

* cited by examiner

*Primary Examiner* — Julian D Huffman
(74) *Attorney, Agent, or Firm* — WORKMAN NYDEGGER

(57) ABSTRACT

A liquid ejecting device includes: a printing unit including a liquid ejecting head configured to eject a liquid to a medium and a head holder configured to form an air cooling path, and a cooling mechanism configured to cause air in the air cooling path to flow therethrough to air-cool the liquid ejecting head, wherein the printing unit is provided so as to be movable with respect to a transport path along which the medium is transported, the cooling mechanism includes a first air hole and a second air hole that are configured to be coupled to the air cooling path, and the air cooling path is coupled to one of the first air hole and the second air hole corresponding to a position of the printing unit.

19 Claims, 21 Drawing Sheets

LIQUID EJECTING DEVICE

The present application is based on, and claims priority from JP Application Serial Number 2020-216420, filed Dec. 25, 2020, and 2021-143077, filed Sep. 2, 2021, the disclosure of which is hereby incorporated by reference herein in its entirety.

BACKGROUND

1. Technical Field

The present disclosure relates to a liquid ejecting device such as a printer.

2. Related Art

For example, as disclosed in JP-A-2016-150490, there has been an ink jet printing apparatus that is an example of a liquid ejecting device, and the ink jet printing apparatus is configured to perform printing on a sheet as an example of a medium, by ejecting ink as an example of a liquid, from an ink jet head as an example of a liquid ejecting head. The ink jet printing apparatus includes a head holder, and a cooling unit that is an example of a cooling mechanism. The cooling unit is configured to generate cooling air in the head holder to cool the ink jet head. Specifically, the cooling unit is configured to blow air from an inlet formed in the head holder, and sucks air from an outlet formed in the head holder.

In the configuration disclosed in JP-A-2016-150490, when the ink jet head and the head holder are moved, there is a concern that the inlet, the outlet, and the cooling unit are positionally displaced from each other so that the ink jet head cannot be cooled.

SUMMARY

According to an aspect of the present disclosure, there is provided a liquid ejecting device that includes: a printing unit including a liquid ejecting head configured to eject a liquid to a medium and a head holder configured to form an air cooling path, and a cooling mechanism configured to cause air in the air cooling path to flow therethrough to air-cool the liquid ejecting head, wherein the printing unit is provided so as to be movable with respect to a transport path along which the medium is transported, the cooling mechanism includes a first air hole and a second air hole that are configured to be coupled to the air cooling path, and the air cooling path is coupled to one of the first air hole and the second air hole corresponding to a position of the printing unit.

DESCRIPTION OF EXEMPLARY EMBODIMENTS

First Embodiment

Figure 1:
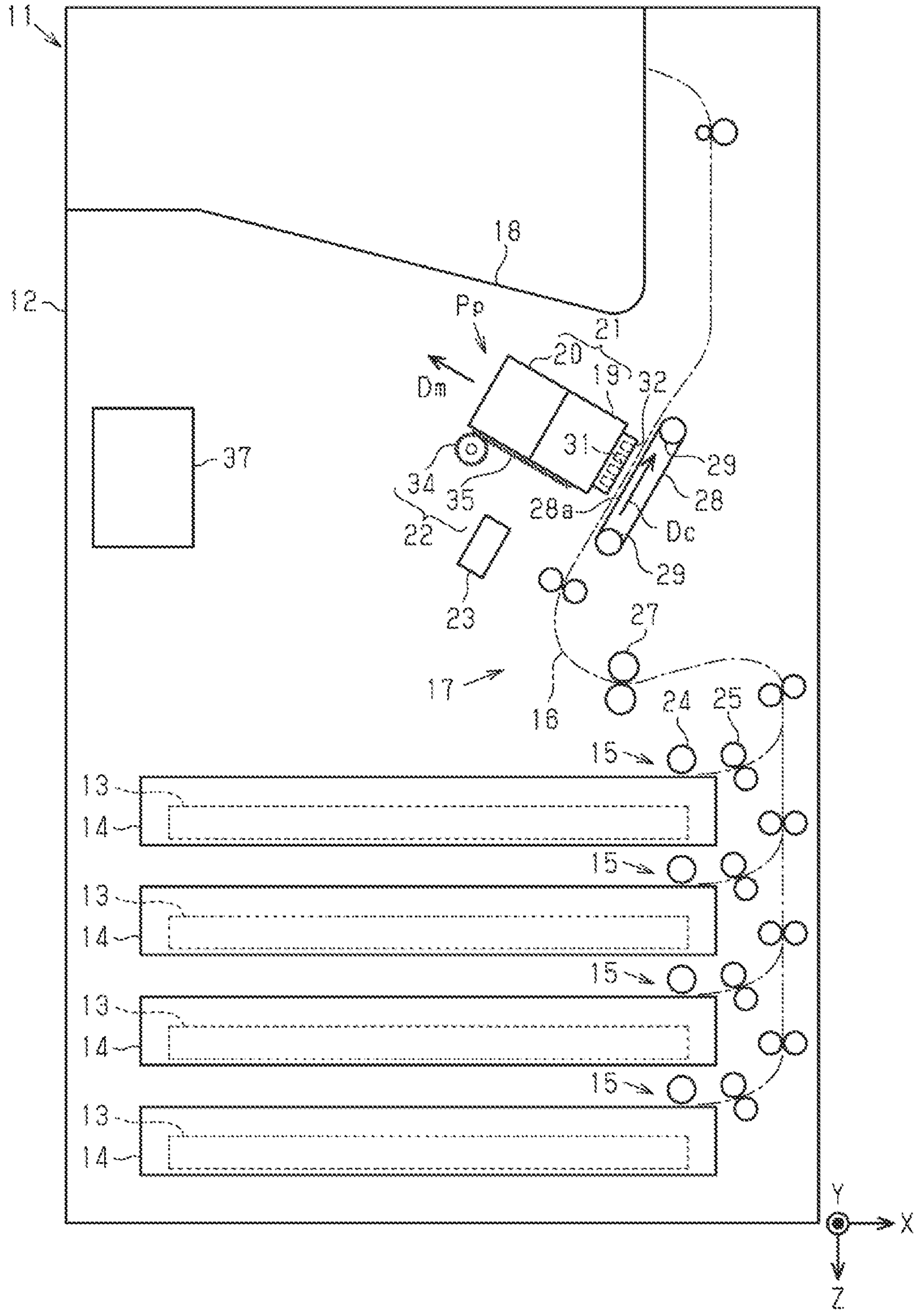
FIG. 1 is a schematic view of a first embodiment of a liquid ejecting device.

Hereinafter, a liquid ejecting device according to a first embodiment is described with reference to drawings. For example, in the present embodiment, the liquid ejecting device is an ink-jet type printer configured to perform printing by ejecting ink that is an example of a liquid to a medium such as a sheet.

In the drawings, a direction of gravity is indicated by a Z axis while assuming that the liquid ejecting device 11 is placed on a horizontal surface, and directions extending along the horizontal plane are indicated by an X axis and a Y axis. The X axis, the Y axis, and the Z axis are orthogonal to each other. In the following description, a direction parallel to the Y axis is also referred to as a depth direction Y, and a direction parallel to the Z axis is also referred to as a vertical direction Z.

As illustrated in FIG. 1, the liquid ejecting device 11 may include a housing 12, a medium accommodating unit 14 configured to accommodate a medium 13, and a feeding unit 15 configured to feed the medium 13. The liquid ejecting device 11 may include a transport unit 17 configured to transport the medium 13 along a transport path 16 that is indicated by a dotted chain line in the drawing, and a stacker 18 configured to receive the medium 13. The transport path 16 is a path coupling the medium accommodating unit 14 and the stacker 18 to each other.

The liquid ejecting device 11 includes a printing unit 21 including a liquid ejecting head 19 configured to eject a liquid to the medium 13, and a head holder 20. The liquid ejecting device 11 may include a movement mechanism 22 configured to move the printing unit 21, and a maintenance unit 23 configured to perform maintenance of the liquid ejecting head 19.

The medium accommodating unit 14 is configured to accommodate a plurality of mediums 13 in a stacked state. The liquid ejecting device 11 may include a plurality of the medium accommodating units 14 and feeding units 15 the number of which is equal to the number of the medium accommodating units 14. The feeding units 15 may each include a feeding roller 24 configured to feed the medium 13 accommodated in the medium accommodating unit 14, and a separating unit 25 configured to separate the mediums 13 one by one. The feeding unit 15 is configured to feed the medium 13 accommodated in the medium accommodating unit 14 to the transport path 16.

The transport unit 17 may include a transport roller 27, an endless transporting belt 28, and a pair of pulleys 29, and the transporting belt 28 is extended between and wound around the pair of pulleys 29. The transport unit 17 may include a plurality of the transport rollers 27. The transport rollers 27 are configured to transport the medium 13 by rotating in a state where the medium 13 is sandwiched between the transport rollers 27.

The transporting belt 28 has a transport surface 28*a* configured to transport the medium 13. The transport surface 28*a* is a flat surface, in an outer peripheral surface of the transporting belt 28, for supporting the medium 13 by electrostatic adsorption, for example. The transport surface 28*a* constitutes a portion of the transport path 16. The transporting belt 28 may be disposed in a state where the transport surface 28*a* is inclined with respect to the horizontal plane. In the present embodiment, a direction that extends along the transport surface 28*a* and along which the medium 13 is transported is referred to as a transport direction Dc. The transporting belt 28 transports the medium 13 in the transport direction Dc by circulating in a state where the medium 13 is supported by the transport surface 28*a*.

The liquid ejecting head 19 has a nozzle surface 32 at which nozzles 31 open. The nozzle surface 32 is constituted of a nozzle plate at which the nozzles 31 are opened. The liquid ejecting head 19 ejects liquid from the nozzles 31 thus performing printing on the medium 13. The liquid ejecting head 19 may be disposed in a state where the nozzle surface 32 is inclined with respect to the horizontal plane. The liquid ejecting head 19 of the present embodiment is a line-type liquid ejecting head configured to eject a liquid in a width direction of the medium 13. The liquid ejecting head 19 is disposed such that a longitudinal direction of the liquid ejecting head 19 agrees with the depth direction Y.

The movement mechanism 22 may include a drive gear 34 and driven teeth 35 provided to the printing unit 21. The driven teeth 35 constitute a rack. The printing unit 21 and the driven teeth 35 move along with the rotation of the drive gear 34. The movement mechanism 22 moves the printing unit 21 in a moving direction Dm that intersects with the nozzle surface 32. The moving direction Dm is a direction in which the printing unit 21 is away from the transporting belt 28. That is, the printing unit 21 is provided so as to be movable with respect to the transport path 16 along which the medium 13 is transported. The moving direction Dm may be a direction perpendicular to the nozzle surface 32. In the present embodiment, the moving direction Dm includes a component in a direction perpendicular to the nozzle plate, and is a direction perpendicular to the transport surface 28*a*. The moving direction Dm includes a component in the vertical direction Z and a component in the horizontal direction.

The movement mechanism 22 moves the printing unit 21 in the moving direction Dm by rotating the drive gear 34 in a normal direction. The movement mechanism 22 moves the printing unit 21 in a direction opposite to the moving direction Dm by reversely rotating the drive gear 34. The liquid ejecting head 19 is movable between a printing position Pp illustrated in FIG. 1 and a maintenance position Pm illustrated in FIG. 4. The printing position Pp is a position at which the liquid ejecting head 19 ejects liquid and printing on the medium 13 is performed. The maintenance position Pm is a position at which maintenance of the liquid ejecting head 19 is performed by the maintenance unit 23. The printing unit 21 may wait at the maintenance position Pm during a period in which printing is not performed.

The maintenance unit 23 of the present embodiment is a cap for capping that is an example of the maintenance. The maintenance unit 23 is brought into contact with the liquid ejecting head 19 positioned at the maintenance position Pm, and forms a closed space surrounding the nozzles 31. The maintenance unit 23 may be a wiper for wiping that is an example of the maintenance, or may be a receiving portion for receiving liquid ejected by flushing that is an example of the maintenance.

The liquid ejecting device 11 includes a control unit 37 configured to control various operations performed by the liquid ejecting device 11. The control unit 37 may be constituted as a circuit which includes: α: one or more processors for executing various processing in accordance with computer programs, β: one or more dedicated hardware circuits, such as an application specific integrated circuit, for executing at least some processing out of various processing, or γ: a combination of α and β. The processor includes a CPU, and a memory such as a RAM, a ROM and the like, and the memory stores program codes or commands configured to cause the CPU to execute the processing. The memory that is, a computer readable medium includes various kinds of readable mediums accessible by a general purpose or dedicated computer.

Cooling Mechanism

Figure 2:
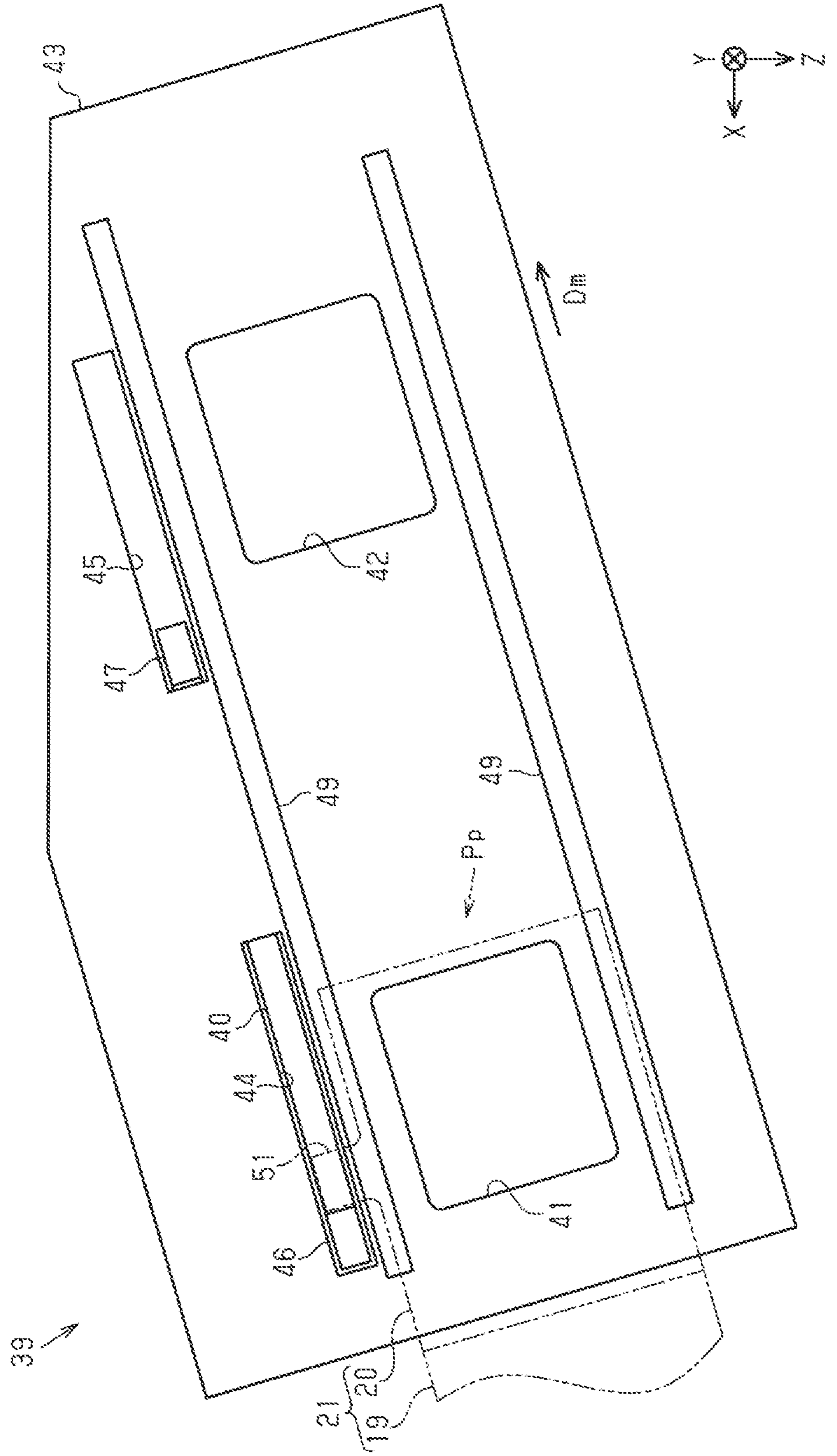
FIG. 2 is a schematic view of a cooling mechanism that the liquid ejecting device includes.

As illustrated in FIG. 2, the liquid ejecting device 11 includes a cooling mechanism 39 configured to cool the liquid ejecting head 19. The cooling mechanism 39 is fixed to a frame, not illustrated in the drawing, of the liquid ejecting device 11. The liquid ejecting device 11 may include an interlocking mechanism 40 configured to be interlocked with the movement of the printing unit 21. The cooling mechanism 39 may include a duct 43 in which a first air hole 41 and a second air hole 42 are formed. At least a portion of the interlocking mechanism 40 may be disposed in the duct 43.

In the duct 43 of the present embodiment, a first hole 44 and a second hole 45 for exposing portions of the interlocking mechanism 40 are formed. Specifically, a first hook 46 that the interlocking mechanism 40 includes protrudes from the first hole 44, and a second hook 47 that the interlocking mechanism 40 includes protrudes from the second hole 45.

The first hole 44 and the second hole 45 of the present embodiment are each formed of a rectangular elongated hole with a longitudinal direction thereof agree with the moving direction Dm. The first air hole 41 and the second air hole 42, the first hole 44 and the second hole 45, and the first hook 46 and the second hook 47 are arranged apart from each other in the moving direction Dm, respectively.

The cooling mechanism 39 may include a rail 49 configured to guide the printing unit 21 in the moving direction Dm. In the present embodiment, the cooling mechanism 39 includes two rails 49. The first air hole 41 and the second air hole 42 open between two rails 49. The rails 49 may be provided on an outer surface of the duct 43 or may be formed by fixing a rail forming member on which the rails 49 are formed to the duct 43.

The head holder 20 may include a protruding portion 51. The protruding portion 51 is positioned between the first hook 46 and the second hook 47 in the moving direction Dm. The protruding portion 51 is configured to transmit power for moving the printing unit 21, to the interlocking mechanism 40, by moving in the moving direction Dm or in the direction opposite to the moving direction Dm along with the movement of the printing unit 21.

Figure 3:
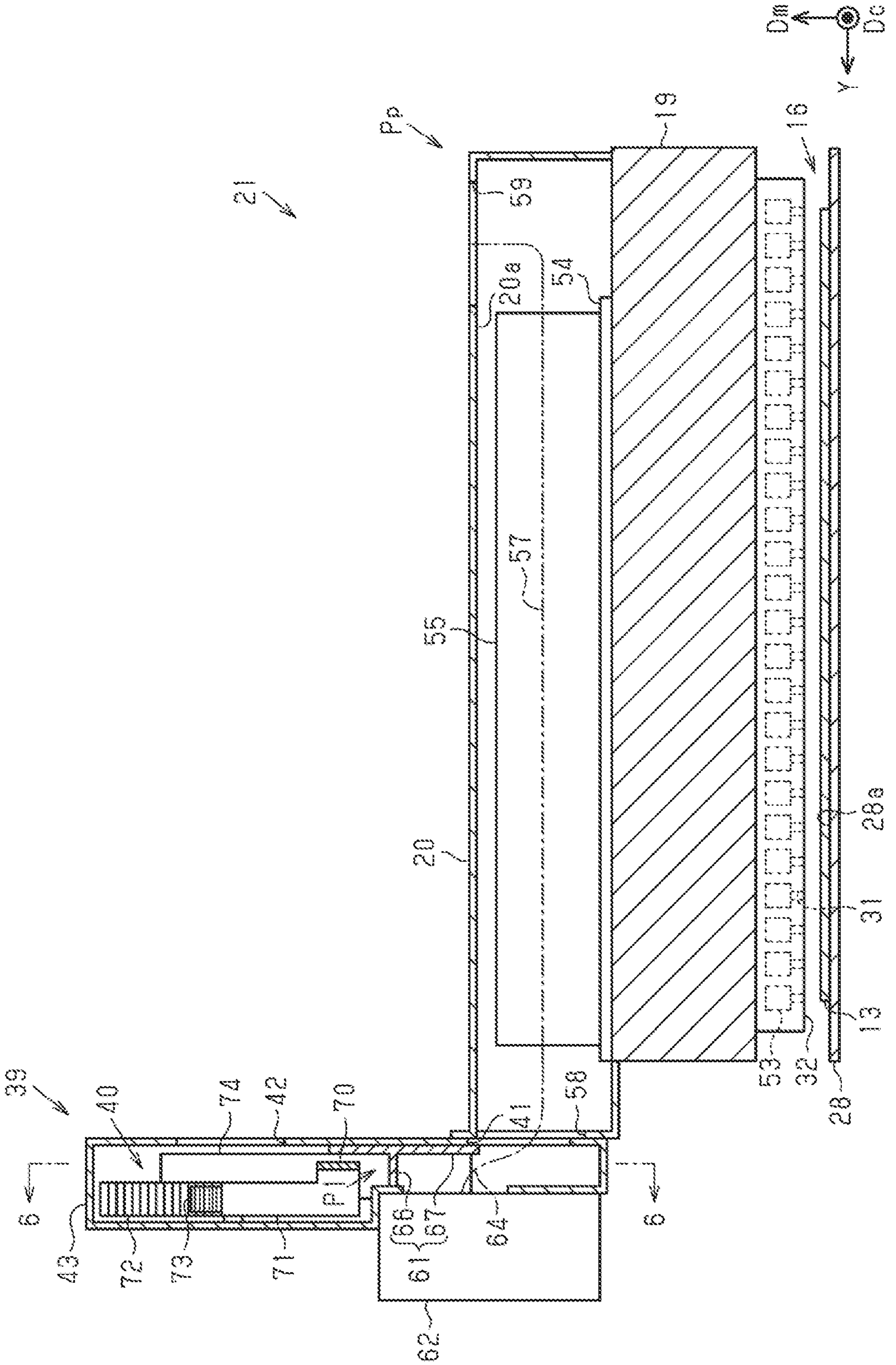
FIG. 3 is a schematic cross-sectional view of a printing unit positioned at a printing position and the cooling mechanism.

As illustrated in FIG. 3, the liquid ejecting head 19 may have a drive element 53, a signal generation circuit 54, and a heat sink 55. In the present embodiment, the head holder 20 also functions as a cover covering the signal generation circuit 54 and the heat sink 55.

The liquid ejecting head 19 may have a plurality of the drive elements 53 respectively corresponding to the plurality of nozzles 31. Each drive element 53 is driven for ejecting liquid from the corresponding nozzle 31. The signal generation circuit 54 generates a drive waveform signal Com to be applied to each drive element 53. Each drive element 53 has a piezoelectric element, for example, and allows liquid to be ejected from the nozzle 31 by deforming the piezoelectric element based on the drive waveform signal Com.

The heat sink 55 is provided so as to enable heat transfer with the signal generation circuit 54. The heat sink 55 may be made of metal having low heat resistance, for example. The heat sink 55 has a shape capable of ensuring a wide surface area such as a shape having a plurality of fins, for example and hence, heat transferred from the signal generation circuit 54 can be easily radiated.

The head holder 20 forms an air cooling path 57 for causing air to flow between the head holder 20 and the liquid ejecting head 19. In the head holder 20, a coupling hole 58 opens at a position in front of the center in the depth direction Y, and a suction hole 59 opens at a position behind the center. The air cooling path 57 couples the suction hole 59 and the coupling hole 58 to each other. The signal generation circuit 54 and the heat sink 55 are disposed in the air cooling path 57. Specifically, the signal generation circuit 54 and the heat sink 55 are disposed between the suction hole 59 and the coupling hole 58 in the depth direction Y.

The suction hole 59 takes outside air in the air cooling path 57. The suction hole 59 may be formed in an upper wall 20*a* of the head holder 20. By forming the suction hole 59 at a position away from the nozzle surface 32 so as to face a direction opposite to a direction in which the nozzle surface 32 faces, flow of air through the suction hole 59 is less likely to affect liquid ejected from the nozzles 31.

Internal Configuration of Cooling Mechanism

As illustrated in FIG. 3, the cooling mechanism 39 may include a shutter 61 configured to close the first air hole 41 or the second air hole 42, and a fan 62 configured to suck air from the air cooling path 57. The cooling mechanism 39 includes the first air hole 41 and the second air hole 42 that are configured to be coupled to the air cooling path 57. The air cooling path 57 is coupled to one of the first air hole 41 and the second air hole 42 corresponding to a position of the printing unit 21. Specifically, the air cooling path 57 couples a coupling hole 58, that is an end of the air cooling path 57, to the first air hole 41 or the second air hole 42.

The duct 43 has a ventilation path 64 that allows air to flow therethrough. The ventilation path 64 opens to the outside through the first air hole 41 and the second air hole 42.

The shutter 61 may have a first wall 66 configured to close the ventilation path 64, and a second wall 67 configured to close the first air hole 41. The shutter 61 closes, in a state where one of the first air hole 41 and the second air hole 42 is coupled to the air cooling path 57, the other of the first air hole 41 and the second air hole 42. In the present embodiment, "closes" means a state where the flow of air is restricted compared to an open state.

Figure 4:
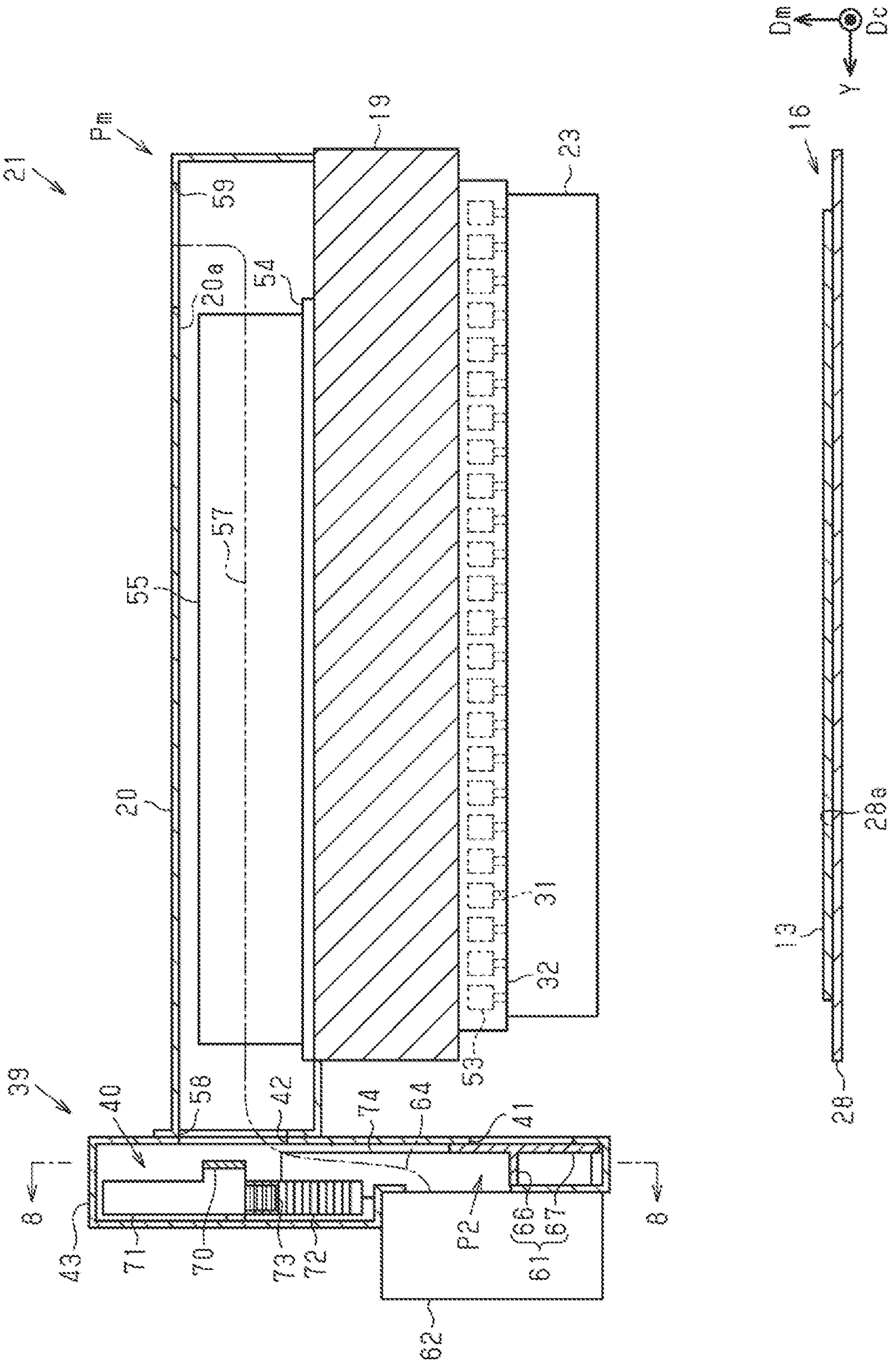
FIG. 4 is a schematic cross-sectional view of the printing unit positioned at a maintenance position and the cooling mechanism.

As illustrated in FIG. 3 and FIG. 4, in the present embodiment, the shutter 61 is provided so as to be movable in the duct 43. The shutter 61 positioned at the first position P1 illustrated in FIG. 3 restricts the flow of air through the second air hole 42 by closing between the first air hole 41 and the second air hole 42. Accordingly, it can also be said that the shutter 61 positioned at the first position P1 closes the second air hole 42. When the shutter 61 is positioned at the first position P1, the first air hole 41 and the fan 62 are coupled to each other through the ventilation path 64.

The shutter 61 positioned at the second position P2 illustrated in FIG. 4 closes the first air hole 41. When the shutter 61 is positioned at the second position P2, the second air hole 42 and the fan 62 are coupled to each other through the ventilation path 64.

A distance between the fan 62 and the first air hole 41 may be shorter than a distance between the fan 62 and the second air hole 42. That is, a length of the ventilation path 64 coupling the first air hole 41 and the fan 62 to each other may be shorter than a length of the ventilation path 64 coupling the second air hole 42 and the fan 62 to each other.

Movement Mechanism

Figure 5:
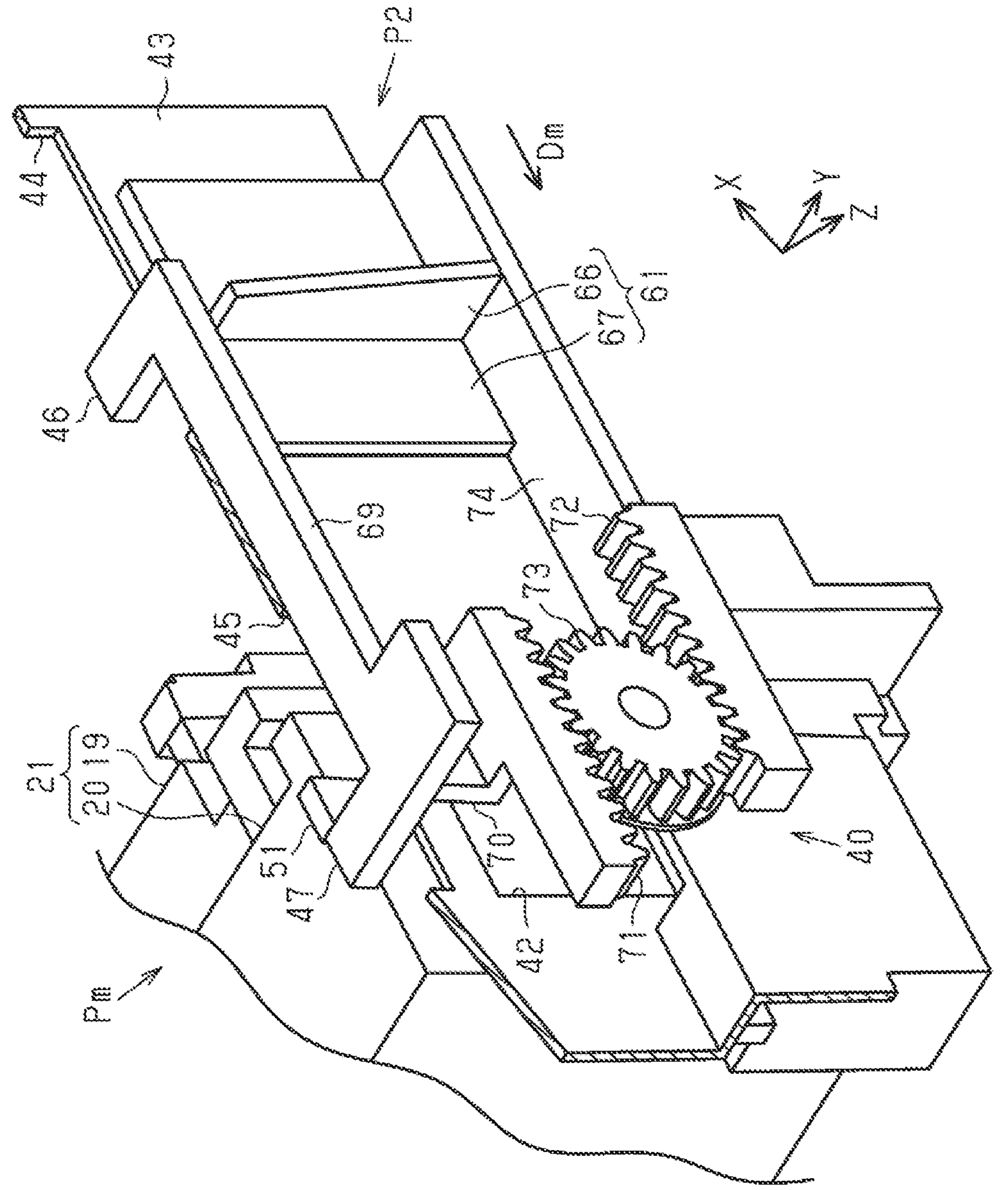
FIG. 5 is a perspective view of an interlocking mechanism.

As illustrated in FIG. 5, the interlocking mechanism 40 may include a coupling portion 69 coupling the first hook 46 and the second hook 47 to each other, a first transmission portion 70, and a first rack 71. The interlocking mechanism 40 may include a second rack 72, a pinion 73 meshing with the first rack 71 and the second rack 72, and a second transmission portion 74.

The first hook 46, the second hook 47, the coupling portion 69, the first transmission portion 70, and the first rack 71 are provided in an integrally movable manner. The coupling portion 69, the first transmission portion 70, and the first rack 71 move together with the printing unit 21 by pressing the first hook 46 or the second hook 47 by the protruding portion 51. The second rack 72, the second transmission portion 74, and the shutter 61 are provided in an integrally movable manner. That is, the second rack 72 moves together with the shutter 61.

The manner of operation of the present embodiment is described.

Figure 6:
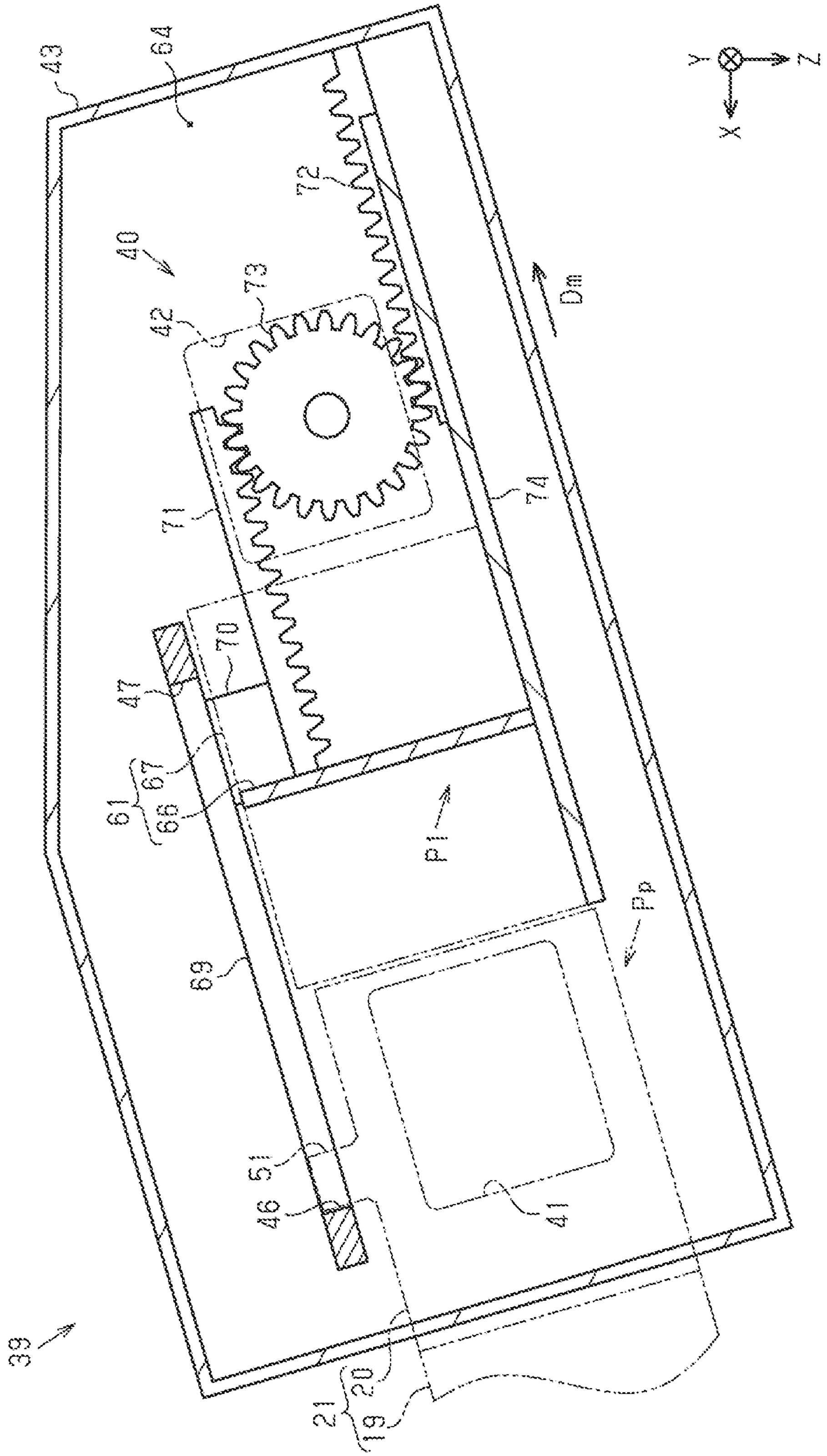
FIG. 6 is a cross-sectional view taken along a line 6-6 in FIG. 3.

As illustrated in FIG. 3 and FIG. 6, when the printing unit 21 is positioned at the printing position Pp, the first air hole 41 is coupled to the air cooling path 57. When the fan 62 is driven, air flows through the air cooling path 57 and the ventilation path 64 that are indicated by a dotted chain line in FIG. 3. Specifically, air that flows into the air cooling path 57 from the suction hole 59 passes the signal generation circuit 54 and the heat sink 55, and is discharged to the outside by the fan 62 through the coupling hole 58, the first air hole 41, and the ventilation path 64. The cooling mechanism 39 causes air in the air cooling path 57 to flow to air-cool the liquid ejecting head 19.

Figure 7:
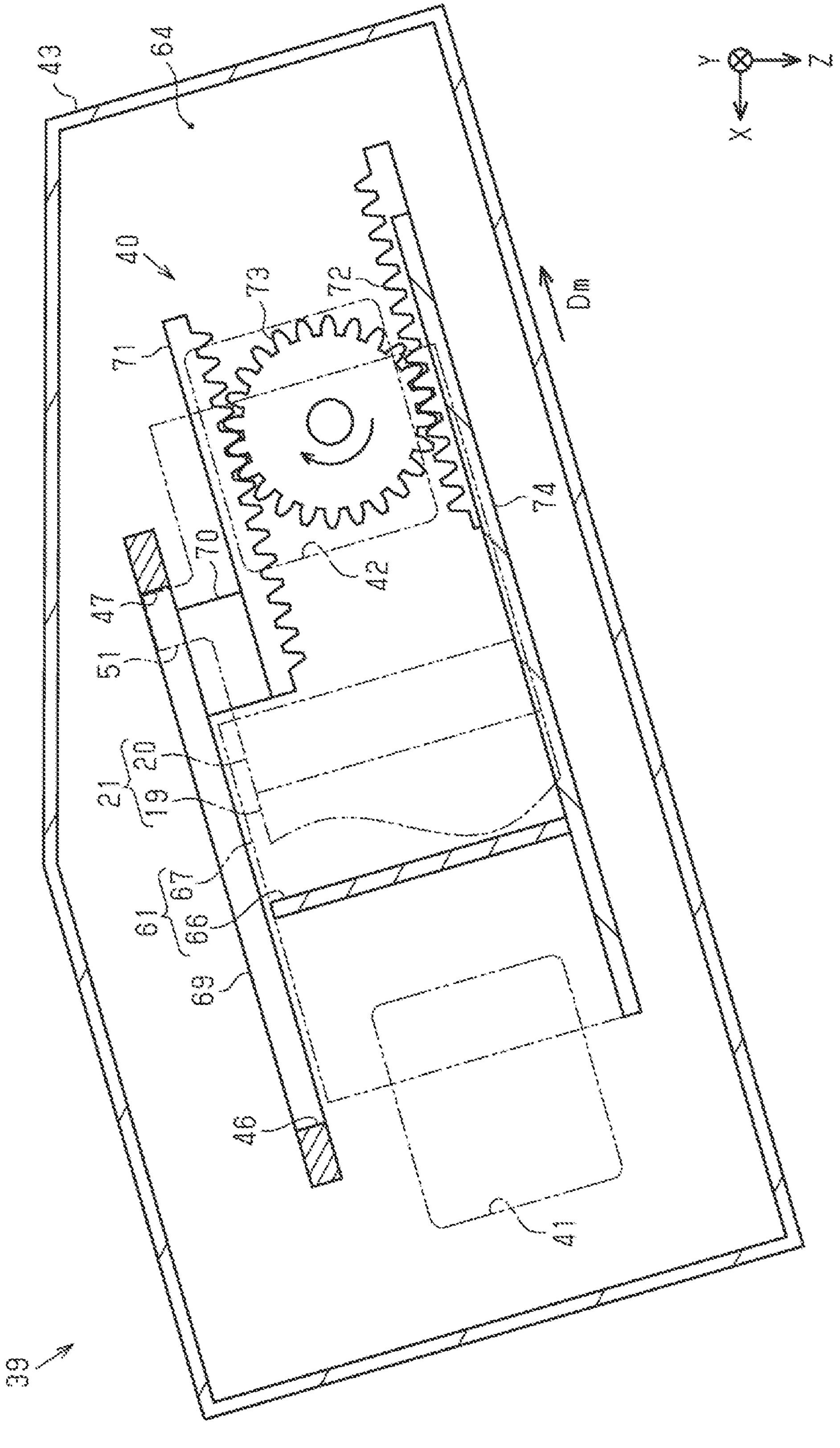
FIG. 7 is a schematic cross-sectional view of the printing unit and the interlocking mechanism when the printing unit presses the interlocking mechanism in a moving direction.

As illustrated in FIG. 7, when the printing unit 21 positioned at the printing position Pp moves in the moving direction Dm, the protruding portion 51 pushes the second hook 47. Due to such pushing, the first hook 46, the second hook 47, the coupling portion 69, the first transmission portion 70, and the first rack 71 move in the moving direction Dm, and the pinion 73 rotates in normal direction. When the pinion 73 rotates in a normal direction, the second rack 72, the second transmission portion 74, and the shutter 61 move in a direction opposite to the moving direction Dm. That is, the interlocking mechanism 40 moves the shutter 61 in an interlocking manner with the movement of the printing unit 21. The shutter 61 moves in a direction opposite to the moving direction Dm that the printing unit 21 moves.

When the shutter 61 moves, the ventilation path 64 is brought into a state where the ventilation path 64 opens to the outside through the first air hole 41 and the second air hole 42. Accordingly, the fan 62 may stop operation thereof while the printing unit 21 is moving.

Figure 8:
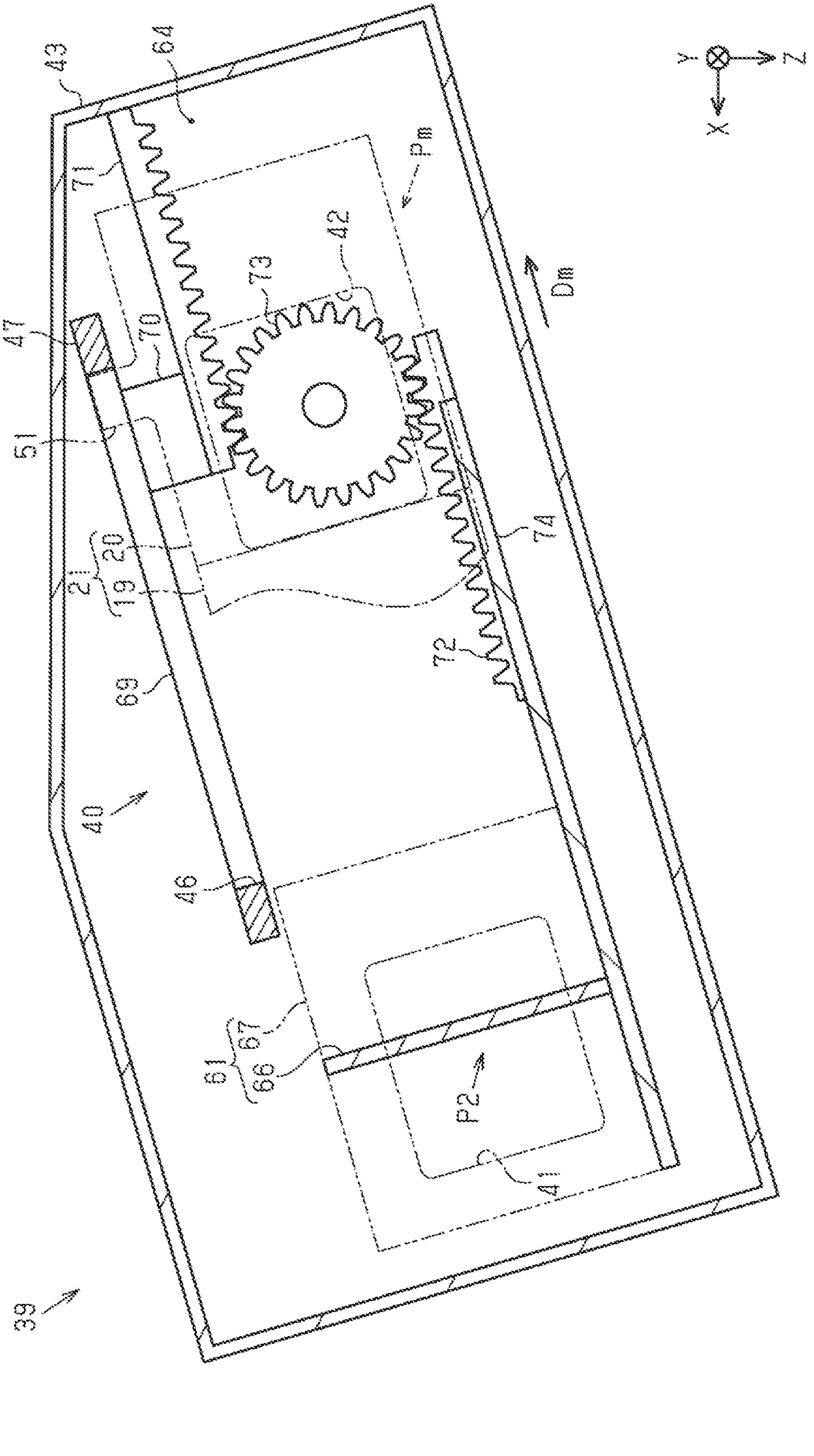
FIG. 8 is a cross-sectional view taken along a line B-B in FIG. 4.

As illustrated in FIG. 4 and FIG. 8, when the printing unit 21 moves to the maintenance position Pm, the shutter 61 is positioned at the second position P2. When the printing unit 21 is positioned at the maintenance position Pm, the second air hole 42 is coupled to the air cooling path 57. When the fan 62 is driven, air flows through the air cooling path 57 and the ventilation path 64 that are indicated by a dotted chain line in FIG. 4. Specifically, air that flows into the air cooling path 57 from the suction hole 59 passes the signal generation circuit 54 and the heat sink 55, and is discharged to the outside by the fan 62 through the coupling hole 58, the second air hole 42, and the ventilation path 64.

The control unit 37 may be configured to control driving of the fan 62 corresponding to a position of the printing unit 21. Specifically, the fan 62 may be configured to cause air in the air cooling path 57 to flow at a first flow rate when the first air hole 41 is coupled to the air cooling path 57, and to cause air in the air cooling path 57 to flow at a second flow rate when the second air hole 42 is coupled to the air cooling path 57. The first flow rate is faster than the second flow rate.

When the printing unit 21 positioned at the maintenance position Pm moves in a direction opposite to the moving direction Dm, the protruding portion 51 pushes the first hook 46. Due to such a pushing operation, the first hook 46, the second hook 47, the coupling portion 69, the first transmission portion 70, and the first rack 71 move in a direction opposite to the moving direction Dm, and the pinion 73 rotates reversely. When the pinion 73 rotates reversely, the second rack 72, the second transmission portion 74, and the shutter 61 move in the moving direction Dm.

Advantageous effects of the present embodiment are described.

(1) The air cooling path 57 is coupled to one of the first air hole 41 and the second air hole 42 corresponding to a position of the printing unit 21. That is, when the printing unit 21 is positioned at a position corresponding to the first air hole 41, the air cooling path 57 is coupled to the first air hole 41. When the printing unit 21 is positioned at a position corresponding to the second air hole 42, the air cooling path 57 is coupled to the second air hole 42. The cooling mechanism 39 is configured to cause air in the air cooling path 57 to flow through one of the first air hole 41 and the second air hole 42 to which the air cooling path 57 is coupled. Accordingly, the cooling mechanism 39 can cool the moving liquid ejecting head 19.

(2) The first air hole 41 is coupled to the air cooling path 57 when the printing unit 21 is positioned at the printing position Pp. The second air hole 42 is coupled to the air cooling path 57 when the printing unit 21 is positioned at the maintenance position Pm. Accordingly, the cooling mechanism 39 can cool the liquid ejecting head 19 positioned at the printing position Pp and the maintenance position Pm.

(3) One of the first air hole 41 and the second air hole 42 is coupled to the air cooling path 57, and the other of the first air hole 41 and the second air hole 42 is closed by the shutter 61. Accordingly, leakage of air from the air hole that is not coupled to the air cooling path 57 can be suppressed.

(4) The cooling mechanism 39 includes the fan 62 that sucks air from the air cooling path 57. That is, the fan 62 cools the liquid ejecting head 19 by causing air taken in the air cooling path 57 from the suction hole 59 to flow. The printing unit 21 positioned at the printing position Pp and performing printing is liable to generate heat compared to a case where the maintenance of printing unit 21 is performed at the maintenance position Pm. In this respect, the fan 62 is provided at a position closer to the first air hole 41 than the second air hole 42. Accordingly, the printing unit 21 that is positioned at the printing position Pp and is coupled to the first air hole 41 can be cooled more efficiently compared to a case where the printing unit 21 is positioned at the maintenance position Pm and is coupled to the second air hole 42.

(5) There is a case where mist, that is misty liquid, floats around the liquid ejecting head 19. When air is sucked from the first air hole 41 and the second air hole 42, there is a concern that mist is sucked together with the air. In this respect, the fan 62 stops operation while the printing unit 21 is moving. That is, since the fan 62 stops operation until the air cooling path 57 is coupled to one of the first air hole 41 and the second air hole 42, and the shutter 61 closes the other of the first air hole 41 and the second air hole 42, the concern that mist is sucked from the first air hole 41 and the second air hole 42 can be reduced.

(6) The air cooling path 57 is coupled to the first air hole 41 when the printing unit 21 is positioned at the printing position Pp, and is coupled to the second air hole 42 when the printing unit 21 is positioned at the maintenance position Pm. When the printing unit 21 is positioned at the printing position Pp, the fan 62 causes air in the air cooling path 57 to flow at a speed faster than a speed in a case where the printing unit 21 is positioned at the maintenance position Pm. Accordingly, the printing unit 21 positioned at the printing position Pp can be efficiently cooled.

(7) Movement of the printing unit 21 and movement of the shutter 61 are interlocked with each other by the interlocking mechanism 40. Accordingly, it is possible to reduce time and efforts for a user compared to a case where the user moves the shutter 61, for example.

(8) The interlocking mechanism 40 includes the first rack 71 and the second rack 72 that mesh with one pinion 73. When the first rack 71 moves, the second rack 72 moves in a direction opposite to a direction in which the first rack 71 moves. Accordingly, the printing unit 21 provided with the first rack 71 and the shutter 61 provided with the second rack 72 can be moved in directions opposite to each other with the simple configuration.

(9) At least a portion of the interlocking mechanism 40 is disposed in the duct 43. Accordingly, a space occupied by the interlocking mechanism 40 can be reduced compared to a case where the whole interlocking mechanism 40 is disposed outside the duct 43.

(10) The liquid ejecting head 19 includes the drive elements 53 and the signal generation circuit 54. Accordingly, a distance between each of the drive elements 53 and the signal generation circuit 54 can be made short compared to a case where the signal generation circuit 54 is provided separately from the printing unit 21, for example.

Second Embodiment

Next, a liquid ejecting device according to a second embodiment is described with reference to the drawings. Here, the second embodiment differs from first embodiment with respect to an interlocking mechanism. Further, other configurations of the second embodiment are substantially equal to the corresponding configurations of the first embodiment and hence, the same symbols are given to the identical configurations, and the repeated description of the configurations is omitted.

Figure 9:
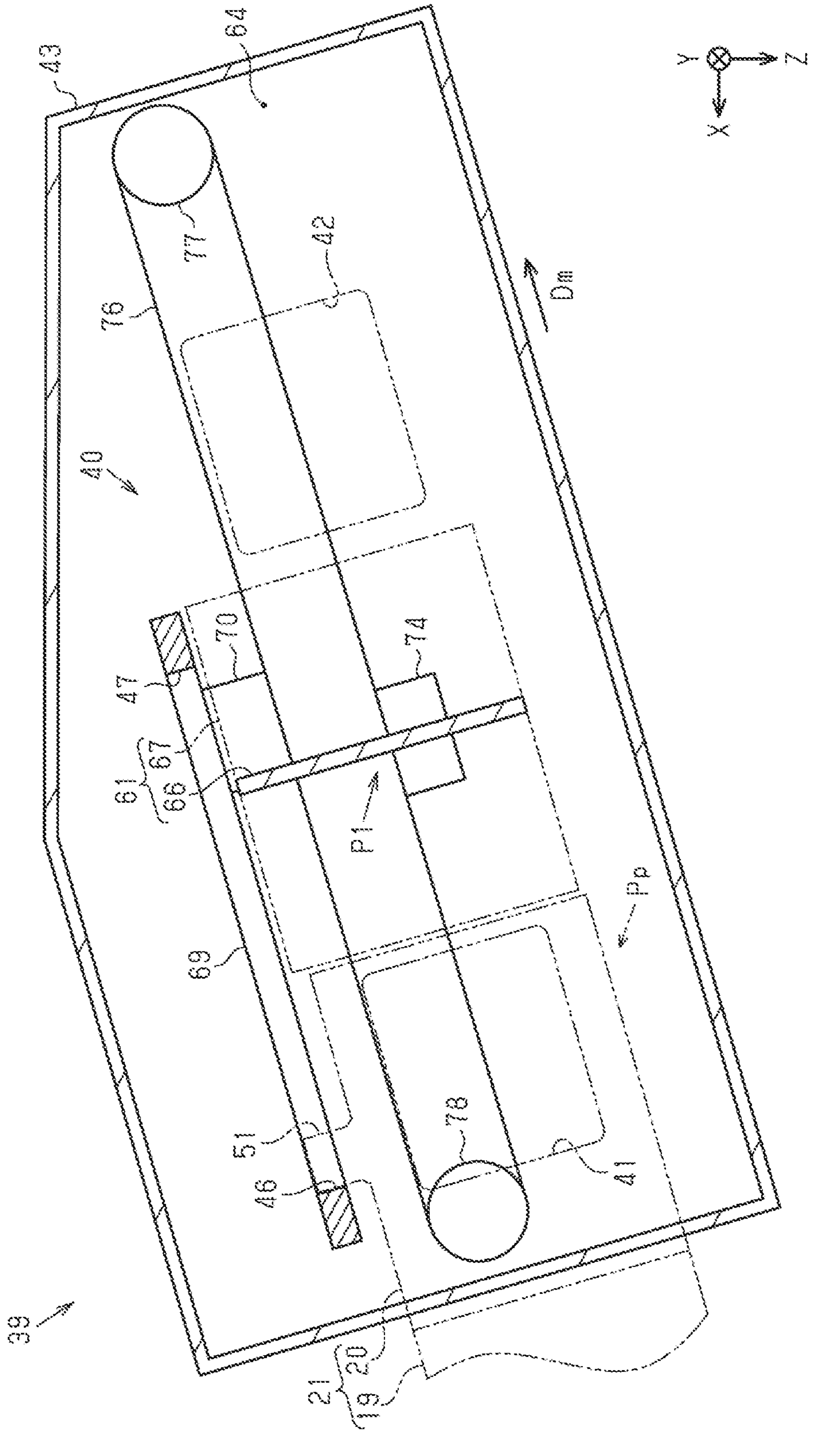
FIG. 9 is a schematic cross-sectional view illustrating an interlocking mechanism that a liquid ejecting device according to a second embodiment includes.

As illustrated in FIG. 9, the interlocking mechanism 40 may include a belt 76 that couples the printing unit 21 and the shutter 61 to each other. For example, the belt 76 may have an annular shape, and may be extended between and wound around a first driven pulley 77 and a second driven pulley 78. The first transmission portion 70 and the second transmission portion 74 may be fixed to the belt 76 respectively. The belt 76 may be configured to transmit power for moving the printing unit 21 to the shutter 61 and to move the shutter 61 in a direction opposite to the moving direction Dm that the printing unit 21 moves.

The manner of operation of the present embodiment is described.

As illustrated in FIG. 9, when the printing unit 21 is positioned at the printing position Pp, the shutter 61 is positioned at the first position P1.

Figure 10:
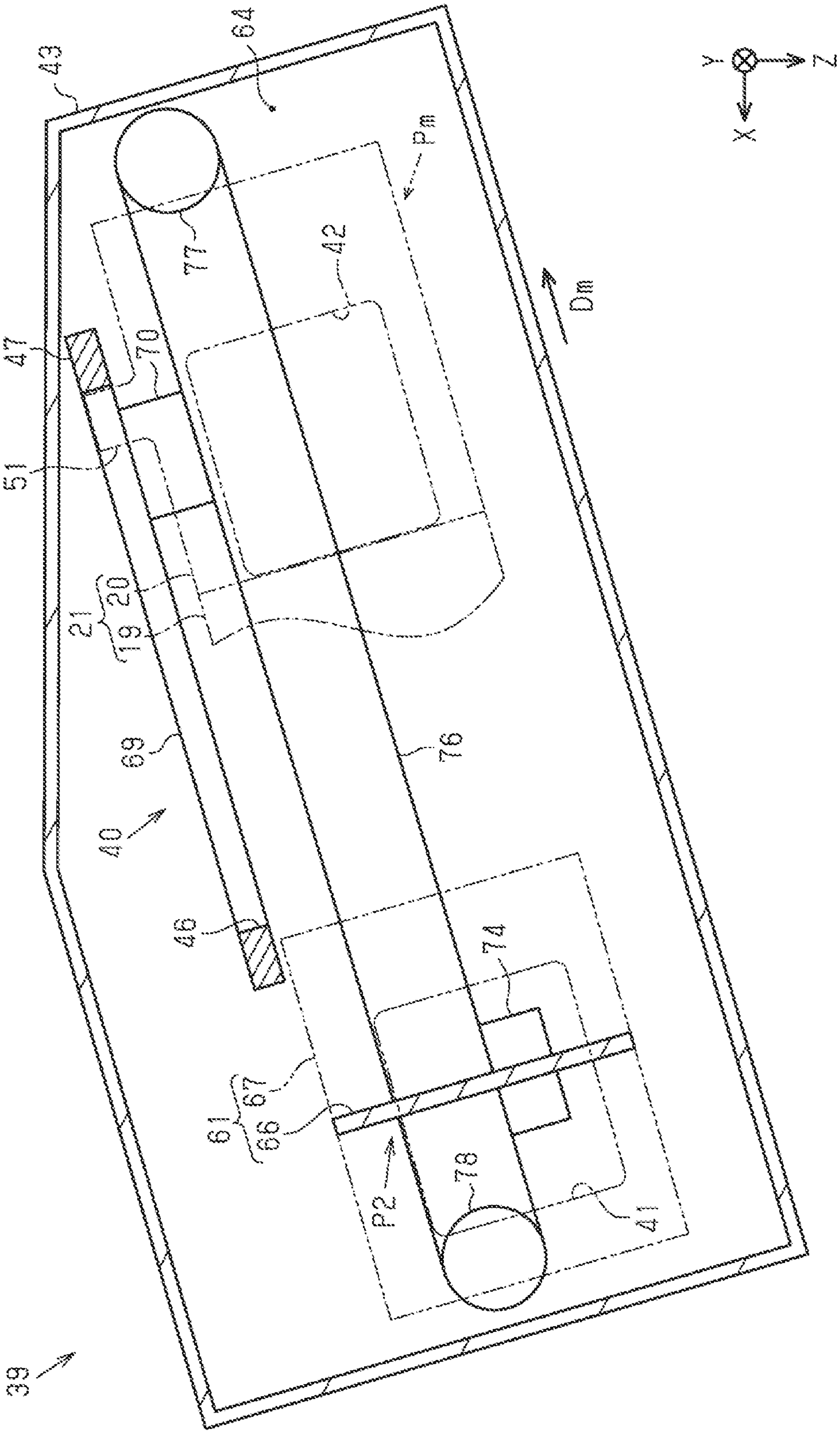
FIG. 10 is a schematic cross-sectional view illustrating a state in which a shutter closes a first air hole.

As illustrated in FIG. 10, when the printing unit 21 moves in the moving direction Dm from the printing position Pp, the second hook 47 moves in the moving direction Dm by being pushed by the protruding portion 51, and rotates the belt 76 in a clockwise direction in FIG. 10. With such operation, the shutter 61 moves in a direction opposite to the moving direction Dm. When the printing unit 21 is positioned at the maintenance position Pm, the shutter 61 is positioned at the second position P2.

As illustrated in FIG. 9, when the printing unit 21 moves in a direction opposite to the moving direction Dm from the maintenance position Pm, the first hook 46 moves in a direction opposite to the moving direction Dm by being pushed by the protruding portion 51, and causes the belt 76 to move in a counterclockwise direction in FIG. 9. With such operation, the shutter 61 moves in the moving direction Dm.

Advantageous effects of the present embodiment are described.

(11) The movement mechanism 22 transfers power, for moving the printing unit 21, to the shutter 61 by the belt 76. By using the deformable belt 76, the degree of freedom in arrangement of the movement mechanism 22 can be enhanced.

Third Embodiment

Next, a liquid ejecting device according to a third embodiment is described with reference to the drawings. Here, the third embodiment differs from the first embodiment and the second embodiment with respect to a point that the third embodiment includes a coupling member. Further, other configurations of the third embodiment are substantially equal to the corresponding configurations of the first embodiment and the second embodiment and hence, the same symbols are given to the identical configurations, and the repeated description of the configurations is omitted. In the following description, a direction parallel to the X axis is also referred to as a width direction X.

Figure 11:
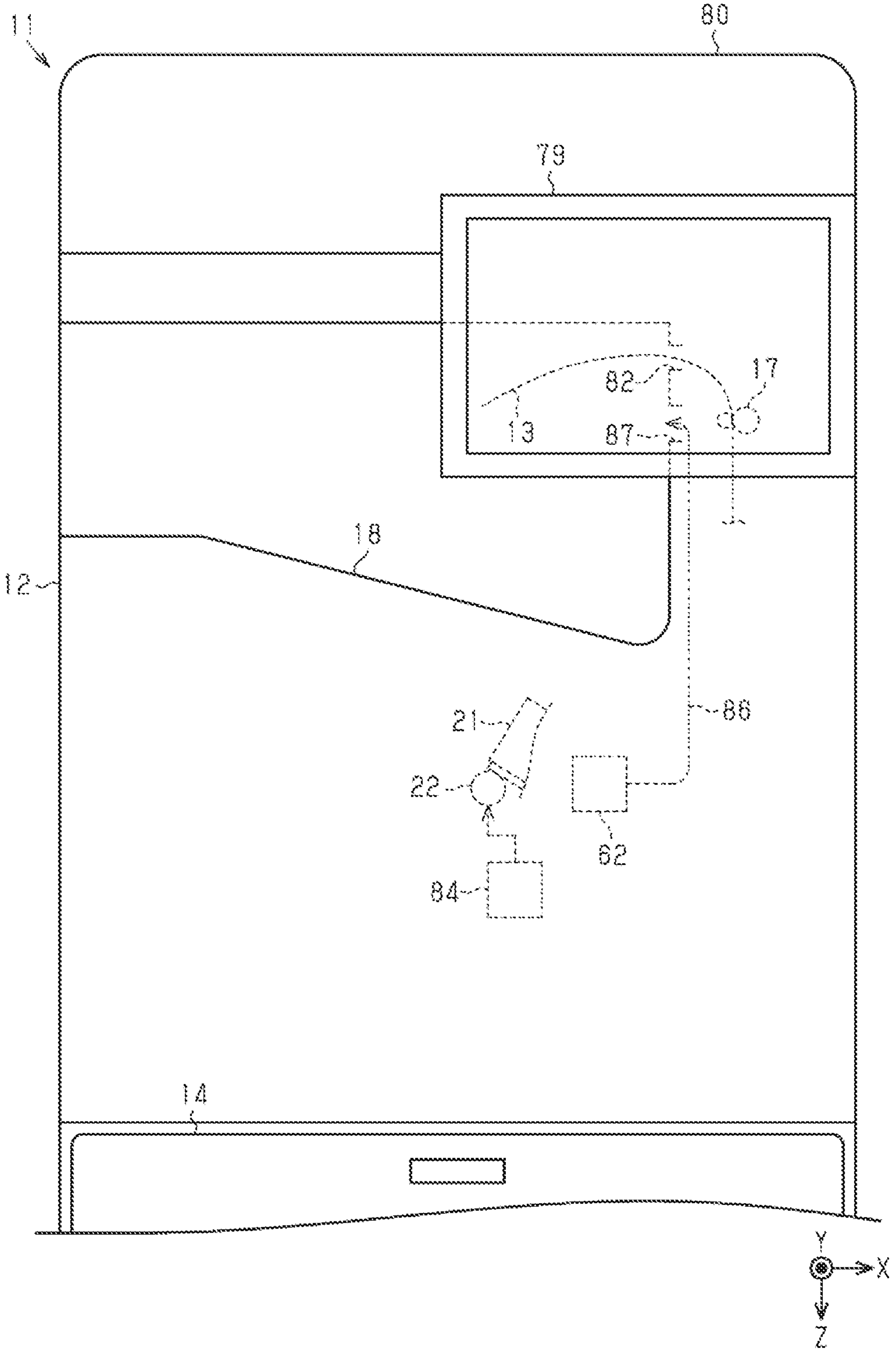
FIG. 11 is a schematic front view of a liquid ejecting device according to a third embodiment.

As illustrated in FIG. 11, a liquid ejecting device 11 includes operation unit 79, and a scanner 80.

The operation unit 79 is disposed on a front surface of the liquid ejecting device 11. The operation unit 79 enables operation of the liquid ejecting device 11. The operation unit 79 may have a touch panel that can be operated by touching a screen, or may have buttons capable of being operated by pushing.

The scanner 80 is configured to read images, such as characters and photographs, recorded on an original not illustrated in the drawing. In the present embodiment, the scanner 80 is disposed above the stacker 18, away from the stacker 18.

The medium 13 transported by the transport unit 17 is discharged from a discharge port 82. In the present embodiment, the discharge port 82 is disposed between the scanner 80 and the stacker 18 in the vertical direction Z. The discharged medium 13 is stacked on the stacker 18.

The liquid ejecting device 11 may include a driving source 84. The driving source 84 is configured to drive the movement mechanism 22. The movement mechanism 22 transfers power of the driving source 84 to the printing unit 21 to move the printing unit 21.

The liquid ejecting device 11 may have an exhaust path 86 and an exhaust port 87. The exhaust path 86 is a passage for air that couples the fan 62 and the exhaust port 87 to each other. The exhaust path 86 may be formed of a tube or a combination of a plurality of members. The exhaust port 87 is configured to discharge air fed through the exhaust path 86. The exhaust port 87 may be formed so as to be positionally displaced from the discharge port 82 in the depth direction Y. In the present embodiment, the exhaust port 87 is positioned between the discharge port 82 and the operation unit 79 in the depth direction Y. When the exhaust port 87 is positioned at a back side of the operation unit 79, the exhaust port 87 can be hidden by the operation unit 79.

Duct

Figure 12:
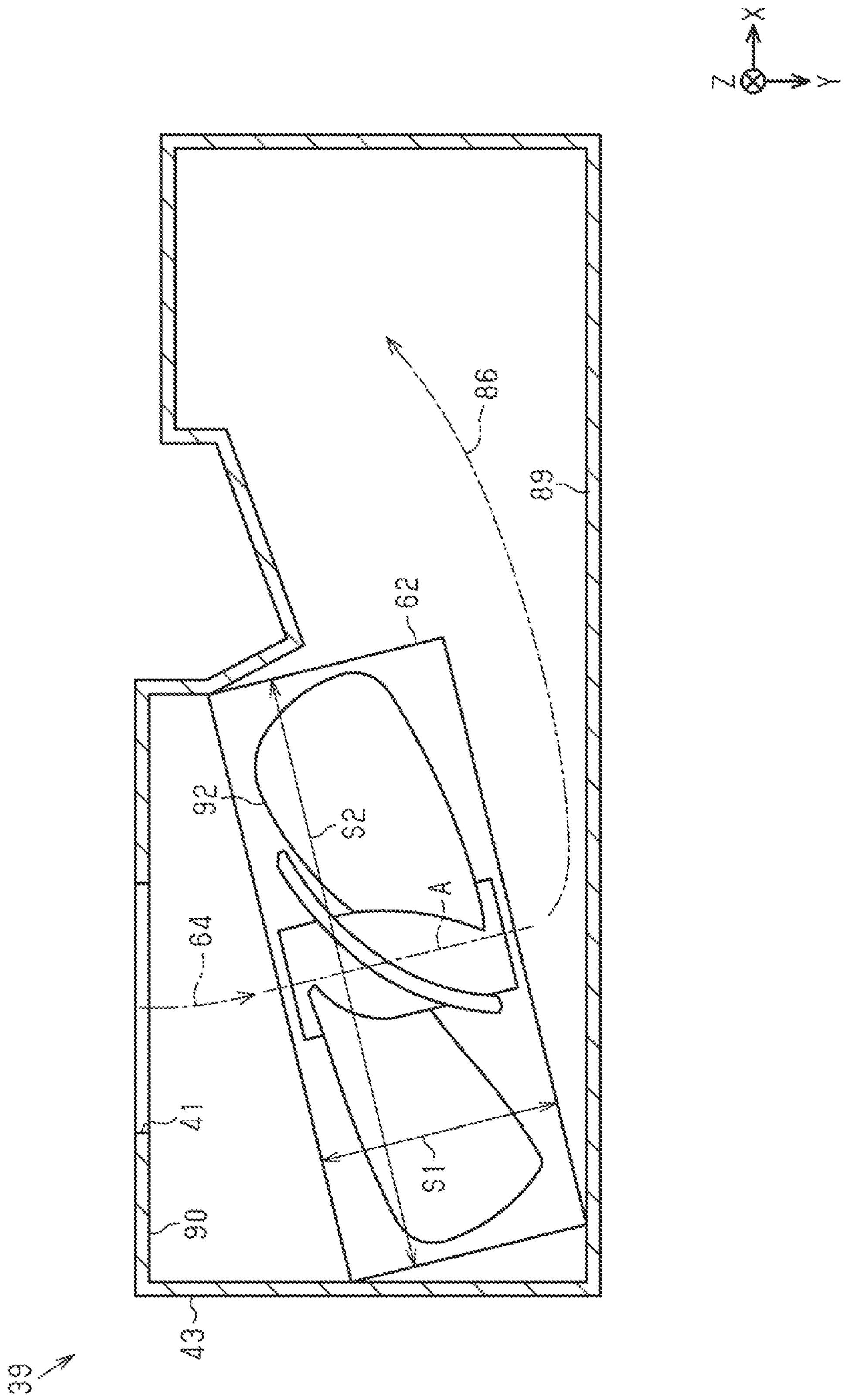
FIG. 12 is a schematic cross-sectional view of a cooling mechanism.

As illustrated in FIG. 12, the duct 43 may form at least a portion of the exhaust path 86. That is, the duct 43 may have the ventilation path 64 and the exhaust path 86. The ventilation path 64 and the exhaust path 86 may be disposed so as to be positionally displaced from each other in the width direction X.

The duct 43 may have a front wall 89 and a rear wall 90.

The front wall 89 is positioned in front of the fan 62 in the depth direction Y. The front wall 89 forms a portion of the exhaust path 86. The front wall 89 may be substantially parallel to the rear wall 90.

The rear wall 90 is positioned behind the fan 62 in the depth direction Y. The rear wall 90 forms a portion of the ventilation path 64. The first air hole 41 is formed in the rear wall 90. The second air hole 42 illustrated in FIG. 2 may be formed in the rear wall 90.

The fan 62 is positioned between the rear wall 90 and the front wall 89 in the depth direction Y. The fan 62 may have blades 92. The blades 92 rotate about a rotation axis A. The fan 62 supplies air from the ventilation path 64 to the exhaust path 86 by rotating the blades 92.

In the present embodiment, the fan 62 is configured such that a first dimension S1 in a direction along the rotation axis A is smaller than a second dimension S2 in a direction orthogonal to the rotation axis A. The fan 62 may be disposed such that the rotation axis A is inclined with respect to the rear wall 90 and the front wall 89. Specifically, in the present embodiment, the fan 62 is disposed such that the rotation axis A is inclined with respect to the X axis and the Y axis. The fan 62 may be disposed such that the rotation axis A is perpendicular to the Z axis. The fan 62 may cause air to obliquely impinge on the front wall 89.

Figure 13:
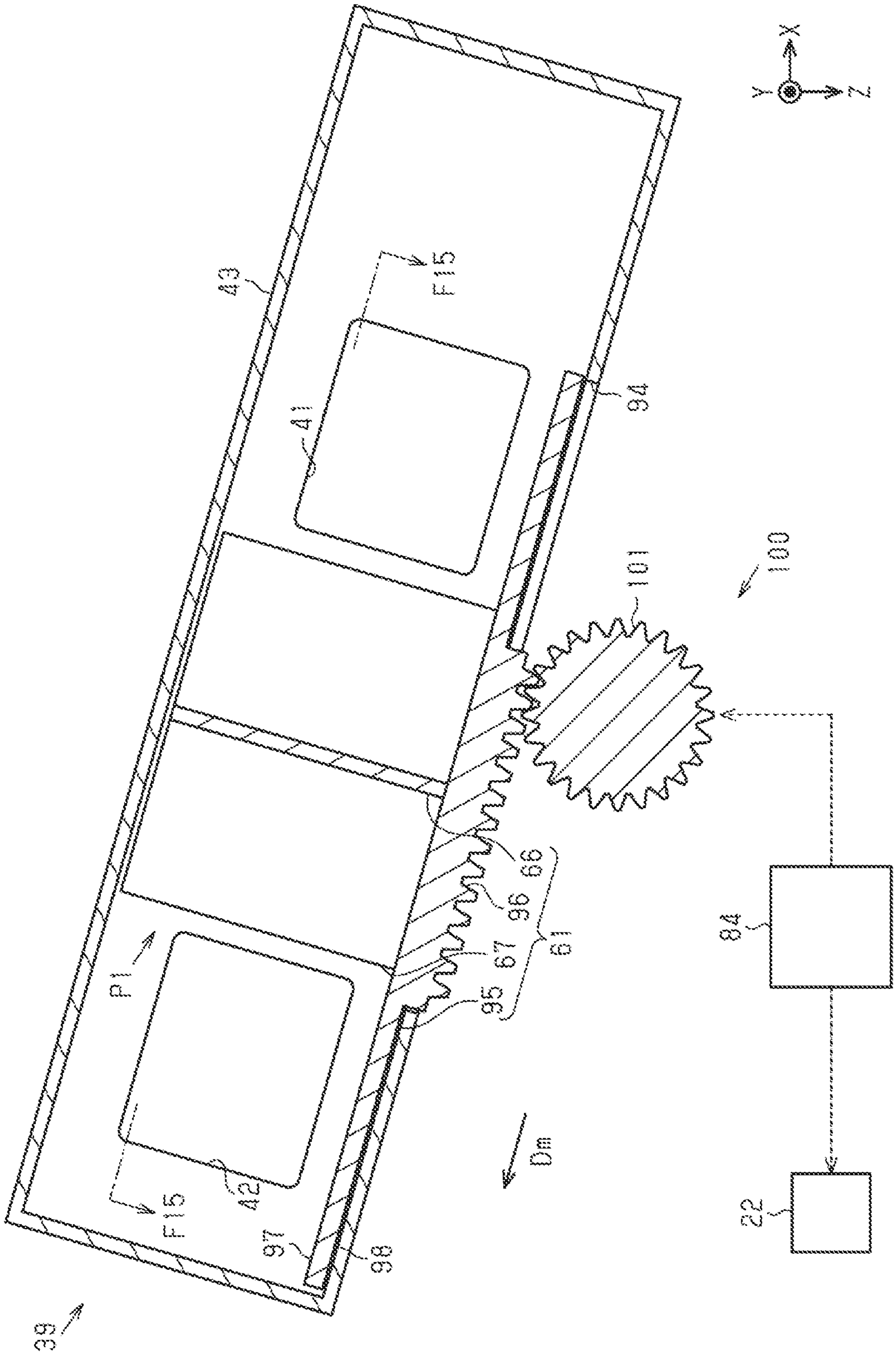
FIG. 13 is a schematic cross-sectional view of the cooling mechanism when a shutter is positioned at a first position.

As illustrated in FIG. 13, the duct 43 may have a third hole 94. The shutter 61 may have the first wall 66, the second wall 67, a third wall 95, and a third rack 96. The third wall 95 may have an upper surface 97 and a lower surface 98. The upper surface 97 is a surface on a side opposite to the lower surface 98. A first wall 66 and the second wall 67 are mounted on the upper surface 97. The third rack 96 is mounted on the lower surface 98. A portion of the lower surface 98 and the third rack 96 are exposed outside the duct 43 through the third hole 94. The third wall 95 may be larger than the third hole 94 in the moving direction Dm and in the depth direction Y. The third wall 95 closes the third hole 94 and hence, leakage of air from the third hole 94 can be reduced.

Power Transmission Mechanism

As illustrated in FIG. 13, the liquid ejecting device 11 includes a power transmission mechanism 100. The power transmission mechanism 100 transfers power of the driving source 84 to the shutter 61 to move the shutter 61. That is, in the present embodiment, the driving source 84 transfers power to the power transmission mechanism 100 and the movement mechanism 22 respectively.

The power transmission mechanism 100 may have at least one transmission gear 101. The power transmission mechanism 100 may have a shaft, a belt, or the like for transferring power. One transmission gear 101 meshes with the third rack 96. The power transmission mechanism 100 moves the shutter 61 to the first position P1 illustrated in FIG. 13 and the second position P2 illustrated in FIG. 14. A direction in which the power transmission mechanism 100 moves the shutter 61 is a direction opposite to a direction in which the movement mechanism 22 moves the printing unit 21.

As illustrated in FIG. 13, the shutter 61 positioned at the first position P1 closes between the first air hole 41 and the second air hole 42 in the same manner as the first embodiment. With such a configuration, the shutter 61 positioned at the first position P1 closes the second air hole 42. In other words, it can also be said that, when the shutter 61 is positioned at the first position P1, the ventilation path 64 coupling the second air hole 42 and the fan 62 to each other is closed. When the shutter 61 is positioned at the first position P1, the first air hole 41 and the fan 62 are coupled to each other through the ventilation path 64.

Figure 14:
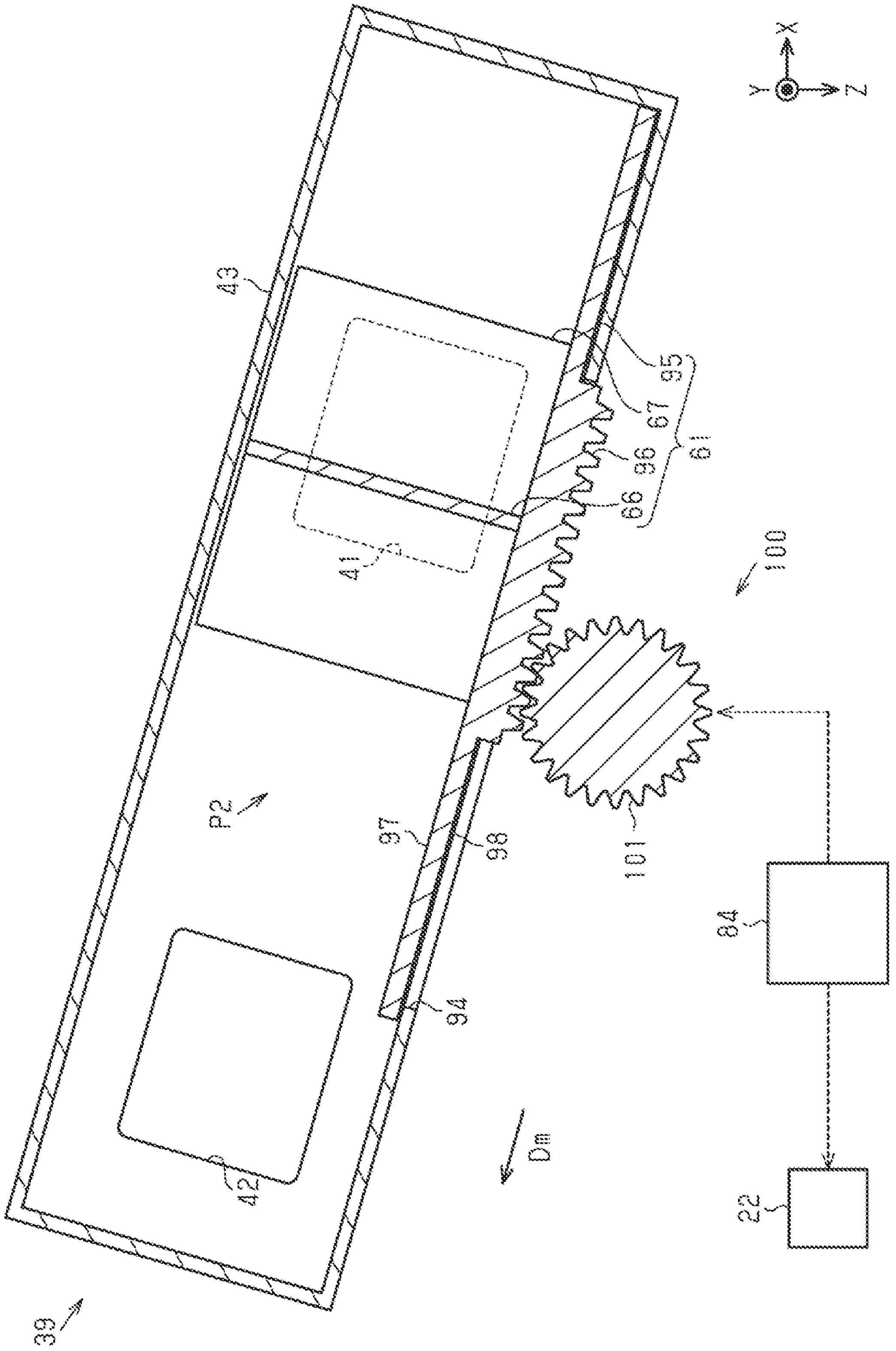
FIG. 14 is a schematic cross-sectional view of the cooling mechanism when the shutter is positioned at a second position.

As illustrated in FIG. 14, the shutter 61 positioned at the second position P2 closes the first air hole 41 in the same manner as the first embodiment. In other words, it can also be said that, when the shutter 61 is positioned at the second position P2, the ventilation path 64 coupling the first air hole 41 and the fan 62 to each other is closed. When the shutter 61 is positioned at the second position P2, the second air hole 42 and the fan 62 are coupled to each other through the ventilation path 64.

Figure 15:
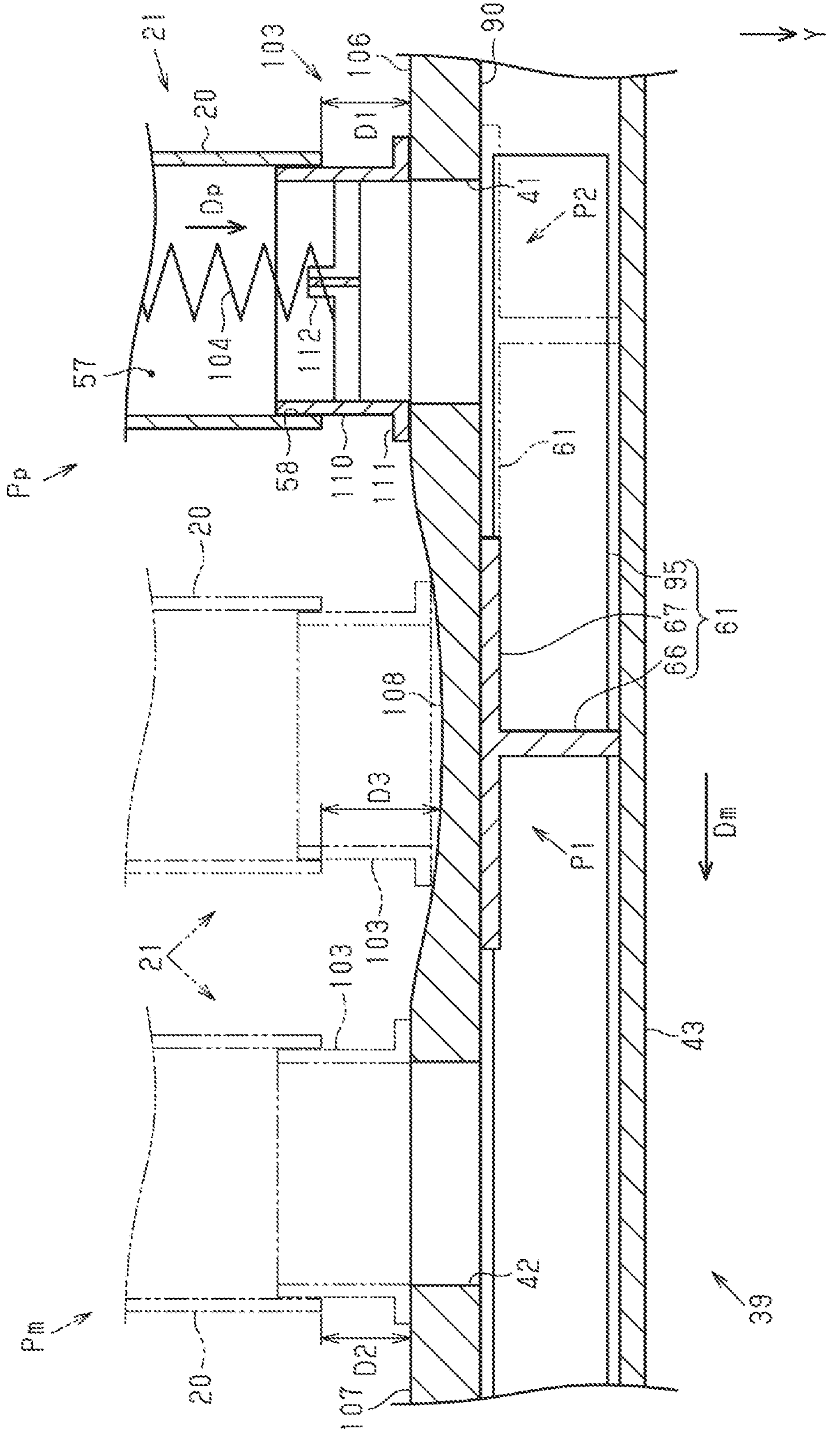
FIG. 15 is a cross-sectional view taken along a line F15-F15 in FIG. 13.

As illustrated in FIG. 15, the liquid ejecting device 11 may include a coupling member 103 and a pressing member 104. The pressing member 104 presses the coupling member 103 to the cooling mechanism 39. In the present embodiment, a direction in which the pressing member 104 presses the coupling member 103 is also referred to as a pressing direction Dp. In the present embodiment, the pressing direction Dp is the same direction as the depth direction Y.

The cooling mechanism 39 may include a first surface 106, a second surface 107, and an intermediate surface 108. In the present embodiment, the rear wall 90 has the first surface 106, the second surface 107, and the intermediate surface 108. The first surface 106, the second surface 107, and the intermediate surface 108 can be brought into contact with the coupling member 103. The pressing member 104 presses the coupling member 103 to the first surface 106, the second surface 107, and the intermediate surface 108.

The rear wall 90 may be formed by combining a plurality of members. For example, the rear wall 90 may be formed by overlaying a plate member having the first surface 106, the second surface 107, and the intermediate surface 108 to a flat plate. The rear wall 90 may be formed by coupling a member having the first surface 106, a member having the second surface 107, and a member having the intermediate surface 108 to each other.

The first surface 106 is disposed around the first air hole 41. The second surface 107 is disposed around the second air hole 42. In other words, the first air hole 41 opens at the first surface 106. The second air hole 42 opens at the second surface 107. The intermediate surface 108 is provided between the first surface 106 and the second surface 107 in the moving direction Dm. The first surface 106 and the second surface 107 may be formed of a flat surface respectively. The rear wall 90 may be formed so as to be gently recessed between the first air hole 41 and the second air hole 42. In the present embodiment, the intermediate surface 108 is a surface recessed relative to the first surface 106 and the second surface 107.

In the pressing direction Dp, a first distance D1 between the first surface 106 and the head holder 20 may be equal to or smaller than a second distance D2 between the second surface 107 and the head holder 20. In the pressing direction Dp, the first distance D1 may be smaller than a third distance D3 between the intermediate surface 108 and the head holder 20.

Head Holder

Figure 16:
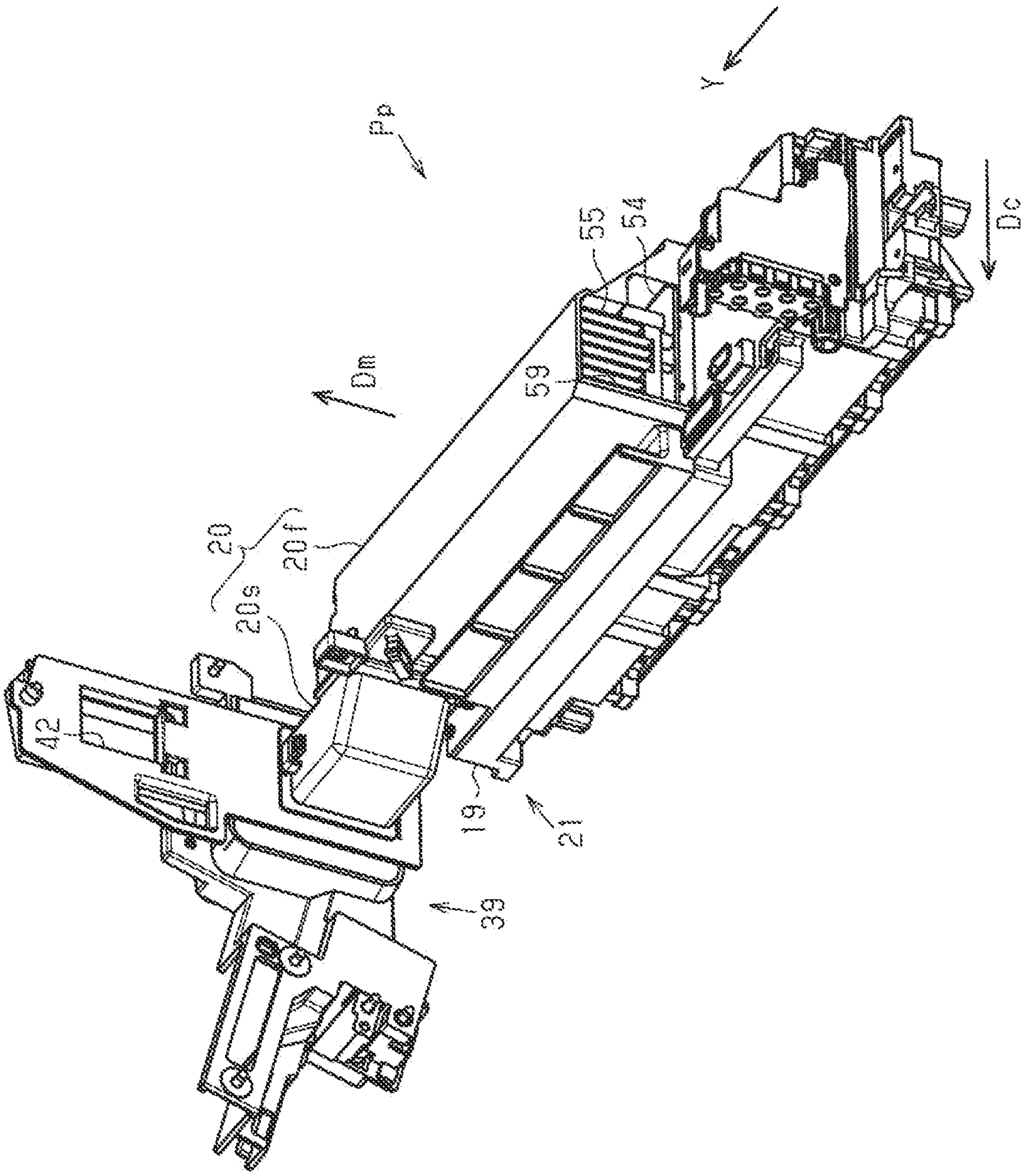
FIG. 16 is a perspective view of the printing unit and the cooling mechanism.

As illustrated in FIG. 16, the head holder 20 may have a first holder **20*f* and a second holder 20*s*. The first holder 20*f* covers the signal generation circuit 54 and the heat sink 55. The suction hole 59 is formed in the first holder 20*f* as an opening. The suction holes 59 may open at a position behind the signal generation circuit 54 and the heat sink 55** in the depth direction Y.

Figure 17:
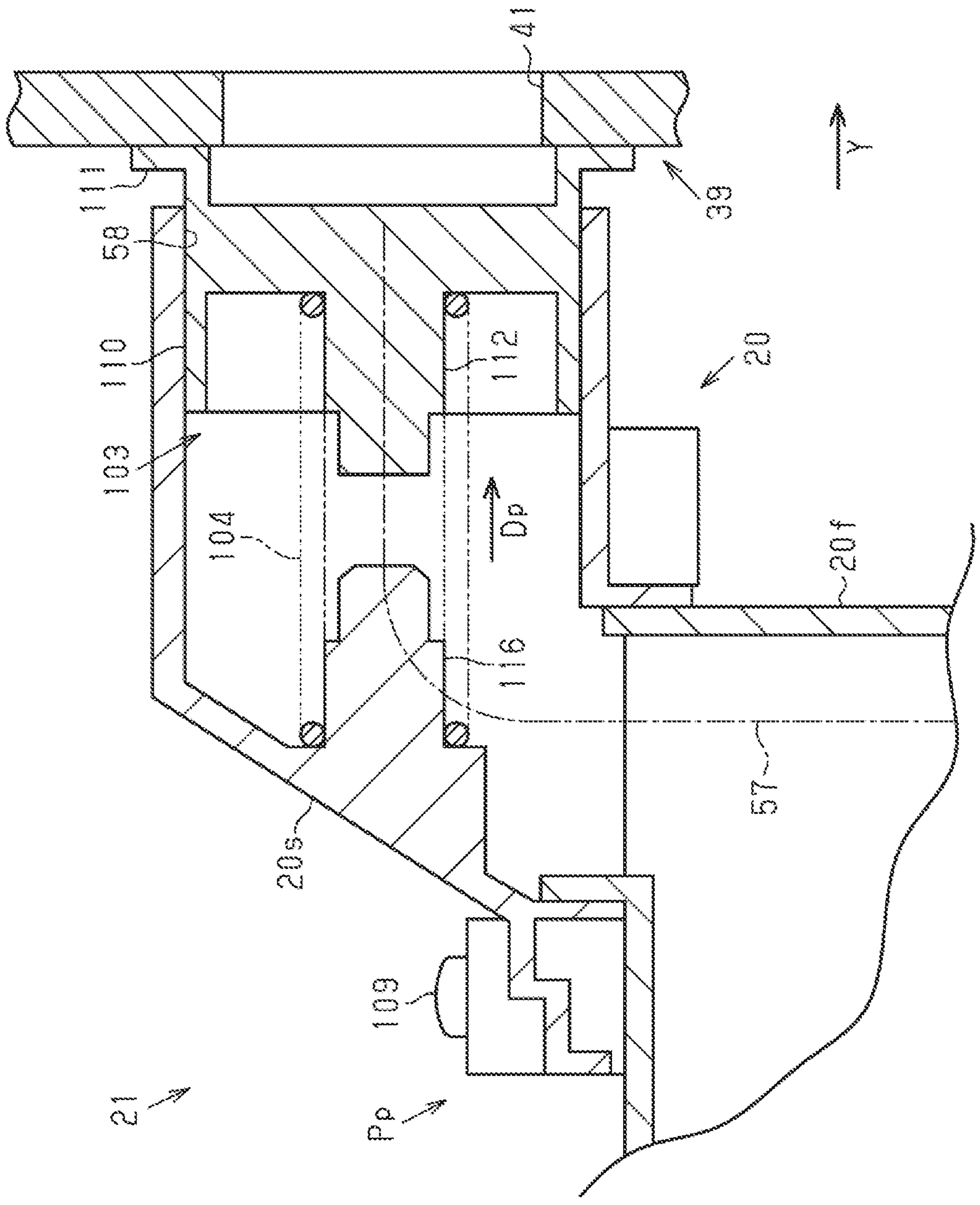
FIG. 17 is a schematic cross-sectional view of a head holder and a coupling member.

As illustrated in FIG. 17, the second holder **20*s* may be fixed to the first holder 20*f* by at least one screw 109. The second holder 20*s* may be fixed at a position in front of the signal generation circuit 54 and the heat sink 55 in the depth direction Y. In the present embodiment, the coupling hole 58 is formed in the second holder 20*s*. In the present embodiment, the air cooling path 57 is formed by the first holder 20*f* and the second holder 20*s***.

Coupling Unit

As illustrated in FIG. 17, the coupling member 103 couples the printing unit 21 and the cooling mechanism 39 to each other. Specifically, the coupling member 103 couples the head holder 20 that the printing unit 21 includes and the cooling mechanism 39 to each other. In the present embodiment, the coupling member 103 is inserted into the second holder **20*s* through the coupling hole 58. The coupling member 103 is provided so as to be movable in the pressing direction Dp with respect to the head holder 20**.

In the present embodiment, the air cooling path 57 is coupled to one of the first air hole 41 and the second air hole 42 by way of the coupling member 103. That is, when the printing unit 21 is positioned at the printing position Pp, the air cooling path 57 is coupled to the first air hole 41 by way of the coupling member 103. When the printing unit 21 is positioned at the maintenance position Pm, the air cooling path 57 is coupled to the second air hole 42 by way of the coupling member 103.

The coupling member 103 may include a cylindrical portion 110, a flange 111, and a first receiving portion 112.

Figure 18:
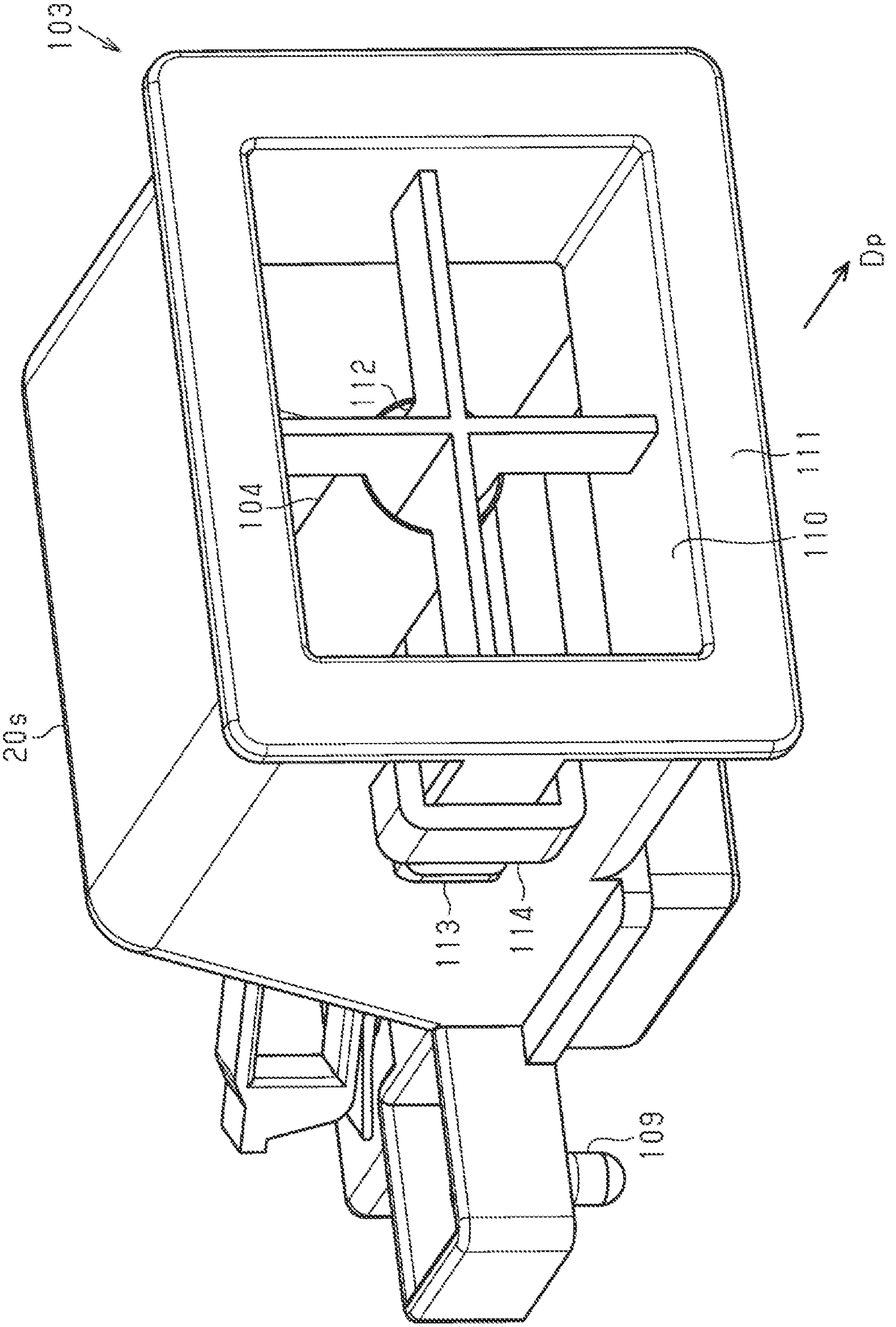
FIG. 18 is a perspective view of a second holder and the coupling member.

As illustrated in FIG. 18, in the present embodiment, the cylindrical portion 110 is a rectangular pipe having an approximately rectangular shape in cross section. The first receiving portion 112 supports an end of the pressing member 104. The first receiving portion 112 may be provided at the center of the cylindrical portion 110.

Figure 19:
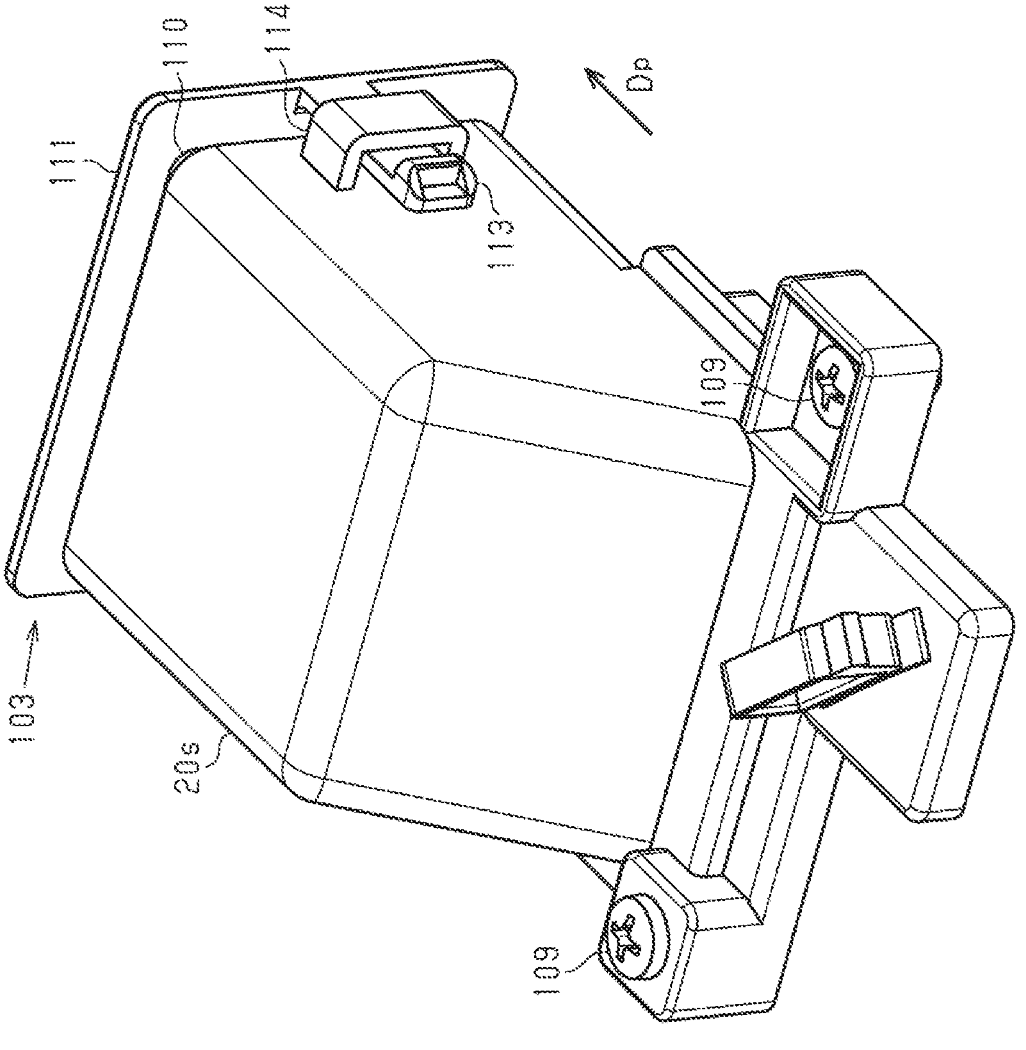
FIG. 19 is a perspective view of the second holder and the coupling member.

As illustrated in FIG. 18 and FIG. 19, the flange 111 is provided at an end of the cylindrical portion 110, and protrudes from the cylindrical portion 110 in an annular shape. The flange 111 is larger than the first air hole 41 and the second air hole 42 in size. The flange 111 has a rectangular annular flat surface that can be brought into contact with the cooling mechanism 39. By bringing the flange 111 into contact with the cooling mechanism 39, an area that the coupling member 103 is brought into contact with the cooling mechanism 39 is increased compared to a case where the cylindrical portion 110 is brought into contact with the cooling mechanism 39, for example. Accordingly, leakage of air is reduced.

Figure 20:
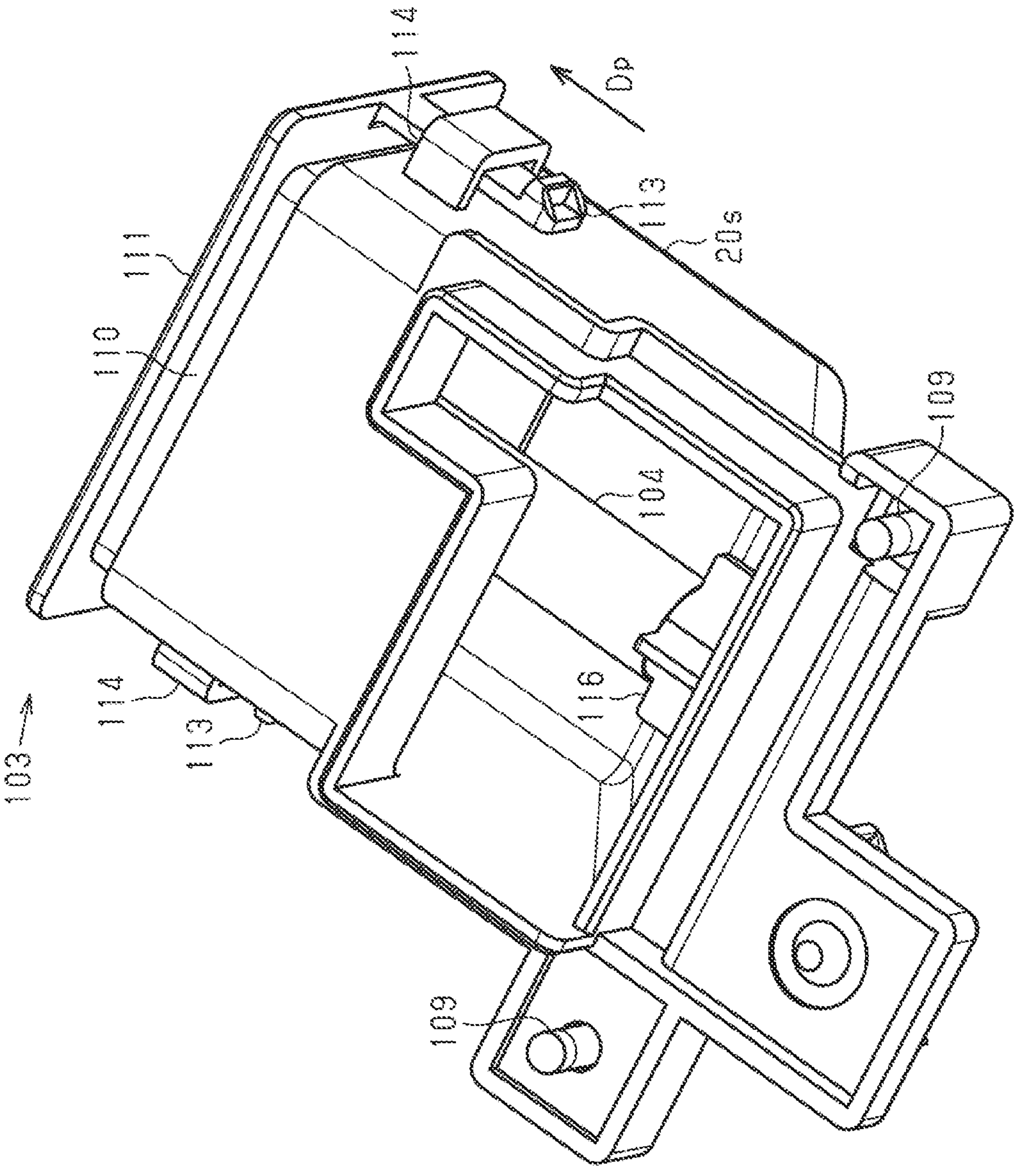
FIG. 20 is a perspective view of the second holder and the coupling member.

As illustrated in FIG. 19 and FIG. 20, the coupling member 103 may have one or a plurality of pawls 113. In the present embodiment, the coupling member 103 has two pawls 113. The second holder 20*s* may include restricting portions 114 the number of which is equal to the number of pawls 113.

The pawls 113 come into contact with the restricting portions 114 thus preventing the removal of the coupling member 103 from the second holder 20*s*. The coupling member 103 may be configured to be removed from the second holder 20*s* by being moved in the pressing direction Dp in a state where the pawls 113 are deformed so as not to be brought into contact with the restricting portions 114. That is, the coupling member 103 may be detachably mounted on the head holder 20. In removing the coupling member 103, the coupling member 103 may be removed from the second holder 20*s* after the coupling member 103 and the second holder 20*s* are removed from the first holder 20*f*.

As illustrated in FIG. 20, the second holder 20*s* may have a second receiving portion 116. The second receiving portion 116 supports an end of the pressing member 104. That is, the pressing member 104 has one end thereof supported by the first receiving portion 112 and has the other end thereof supported by the second receiving portion 116. In the present embodiment, the pressing member 104 is a compression spring. The pressing member 104 pushes the first receiving portion 112 such that the first receiving portion 112 is away from the second receiving portion 116. The second receiving portion 116 and the first receiving portion 112 are aligned in the pressing direction Dp.

The manner of operation of the present embodiment is described.

As illustrated in FIG. 15, when the printing unit 21 is positioned at the printing position Pp, the shutter 61 is positioned at the first position P1. The coupling member 103 couples the air cooling path 57 to the first air hole 41.

When the driving source 84 is driven in a normal direction, the printing unit 21 moves in the moving direction Dm, and the shutter 61 moves in a direction opposite to the moving direction Dm. The power transmission mechanism 100 may move the shutter 61 from the first position P1 to the second position P2 while the printing unit 21 is moving from the printing position Pp to the maintenance position Pm. When the printing unit 21 reaches the maintenance position Pm, the shutter 61 may reach the second position P2. When the printing unit 21 is positioned at the maintenance position Pm, the shutter 61 is positioned at the second position P2. The coupling member 103 couples the air cooling path 57 to the second air hole 42.

When the driving source 84 is reversely driven, the printing unit 21 moves in a direction opposite to the moving direction Dm, and the shutter 61 moves in the moving direction Dm. The power transmission mechanism 100 may move the shutter 61 from the second position P2 to the first position P1 while the printing unit 21 is moving from the maintenance position Pm to the printing position Pp.

Advantageous effects of the present embodiment are described.

(12) Power of the driving source 84 is transmitted to the printing unit 21 by the movement mechanism 22, and is transmitted to the shutter 61 by the power transmission mechanism 100. Accordingly, a load applied to the printing unit 21 can be reduced compared to a case where power is transmitted to the shutter 61 by way of the printing unit 21, for example.

(13) When the positional accuracy between the printing unit 21 having the air cooling path 57 and the cooling mechanism 39 having the first air hole 41 and the second air hole 42 is low, there is a concern that air is leaked from between the printing unit 21 and the cooling mechanism 39. In this respect, the air cooling path 57 is coupled to the first air hole 41 or the second air hole 42 by way of the coupling member 103. Accordingly, even when the alignment accuracy between the cooling mechanism 39 and the printing unit 21 is low, such low alignment accuracy can be compensated by the coupling member 103 and hence, leakage of air can be easily reduced.

(14) The pressing member 104 presses the coupling member 103 to the cooling mechanism 39. Accordingly, a sealing property between the coupling member 103 and the cooling mechanism 39 can be increased.

(15) The first distance D1 between the first surface 106 and the head holder 20 is smaller than the third distance D3 between the intermediate surface 108 and the head holder 20. Accordingly, the pressing member 104 presses the coupling member 103 to the first surface 106 with a force larger than the force of pressing the coupling member 103 to the intermediate surface 108. As a result, a sealing property between the coupling member 103 and the first surface 106 can be increased.

(16) The coupling member 103 is mounted on the head holder 20. Accordingly, the coupling member 103 can be moved together with the printing unit 21 and hence, a coupling destination of the air cooling path 57 can be easily switched. Since the coupling member 103 is detachable, it is possible to easily perform maintenance of the coupling member 103 and the printing unit 21.

(17) The third distance D3 between the intermediate surface 108 and the head holder 20 is larger than the first distance D1 between the first surface 106 and the head holder 20 and the second distance D2 between the second surface 107 and the head holder 20. Therefore, a force that the pressing member 104 presses the coupling member 103 to the intermediate surface 108 is smaller than a force that the pressing member 104 presses the coupling member 103 to the first surface 106 or the second surface 107. Accordingly, a frictional force between the coupling member 103 that moves together with the printing unit 21 and the cooling mechanism 39 can be reduced and hence, it is possible to easily move the printing unit 21.

(18) For example, when the rotation axis A of the fan 62 is parallel to the Y axis, the fan 62 causes air to impinge on the front wall 89 perpendicularly. In this case, the air bounces off the front wall 89 and hence, air is hardly fed to the exhaust port 87. In this respect, the fan 62 causes air to impinge on the front wall 89 obliquely and hence, exhausting of the air can be smoothly performed.

(19) In the fan 62, the first dimension S1 in a direction along the rotation axis A is smaller than the second dimension S2 in a direction orthogonal to the rotation axis A. Accordingly, by providing the fan 62 such that the rotation axis A is inclined with respect to the X axis and the Y axis, an area occupied by the fan 62 in the depth direction Y can be made small, compared to a case where the fan 62 is disposed such that the rotation axis A becomes parallel to the X axis, for example.

Fourth Embodiment

Next, a liquid ejecting device according to a fourth embodiment is described with reference to the drawings. Here, the fourth embodiment differs from the third embodiment with respect to a configuration of a coupling member. Further, other configurations of the fourth embodiment are substantially equal to the corresponding configurations of the first to third embodiments and hence, the same symbols are given to the identical configurations, and the repeated description of the configurations is omitted.

Figure 21:
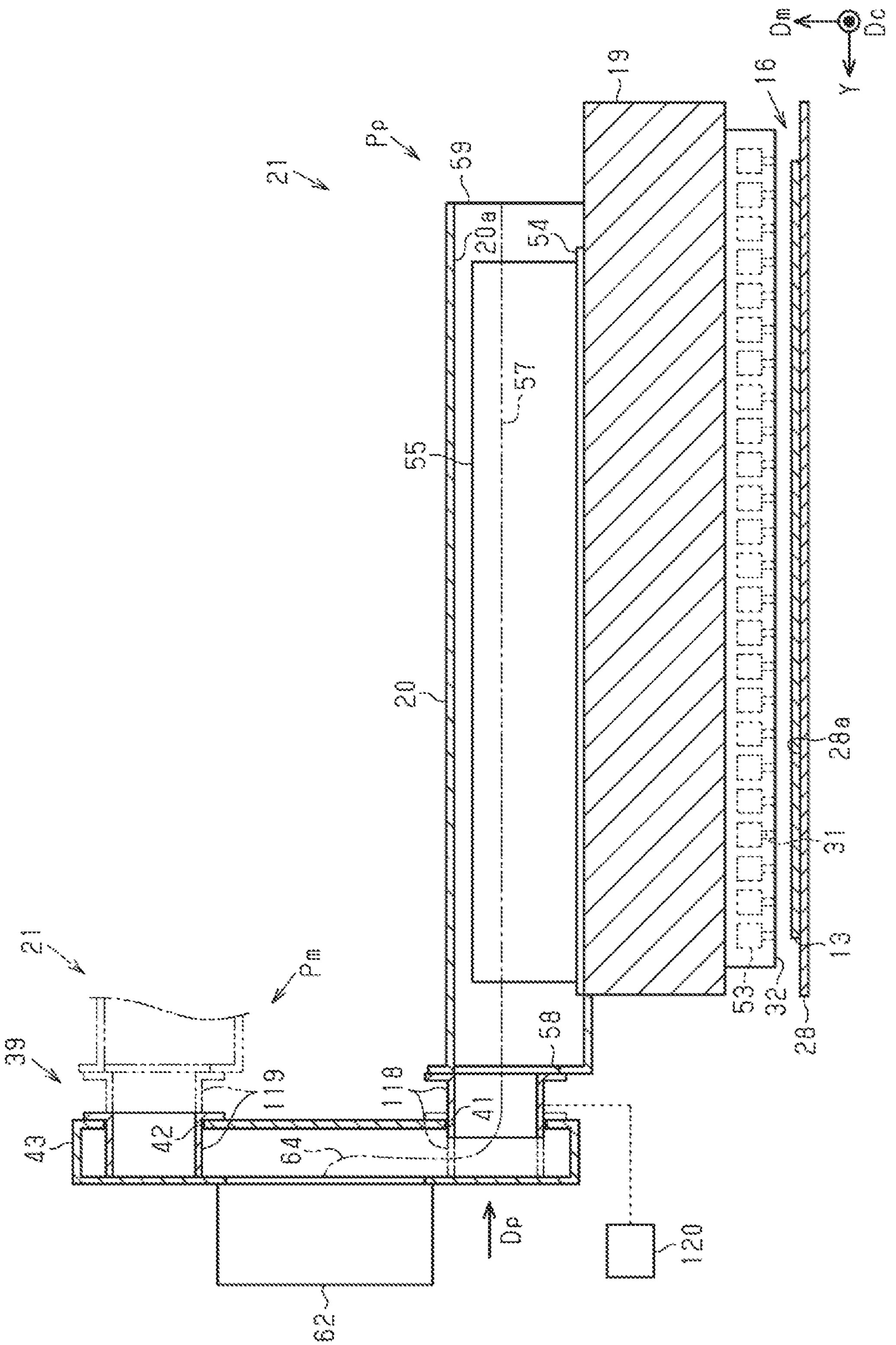
FIG. 21 is a schematic cross-sectional view of a printing unit and a cooling mechanism that a liquid ejecting device according to a fourth embodiment includes.

As illustrated in FIG. 21, a liquid ejecting device 11 includes a plurality of coupling members. In the present embodiment, the liquid ejecting device 11 includes a first coupling member 118 that is an example of the coupling member, and a second coupling member 119 that is an example of the coupling member. The liquid ejecting device 11 may include a pressing mechanism 120. The pressing mechanism 120 presses the first coupling member 118 and the second coupling member 119 to a printing unit 21 respectively. In the present embodiment, a pressing direction Dp is a direction in which the pressing mechanism 120 pushes the first coupling member 118 and the second coupling member 119, respectively.

The first coupling member 118 and the second coupling member 119 may be provided to a cooling mechanism 39. The first coupling member 118 and the second coupling member 119 may be provided to the cooling mechanism 39 in a detachable manner. In the present embodiment, the first coupling member 118 is inserted into a first air hole 41, and is provided so as to be movable in the pressing direction Dp with respect to the cooling mechanism 39. The second coupling member 119 is inserted into a second air hole 42, and is provided so as to be movable in the pressing direction Dp with respect to the cooling mechanism 39.

The pressing mechanism 120 may be configured to move the first coupling member 118 to a coupling position indicated by a solid line in FIG. 21, and a closed position illustrated by a double-dashed chain line in FIG. 21. The pressing mechanism 120 may be configured to move the second coupling member 119 to a coupling position illustrated by a double-dashed chain line in FIG. 21, and a closed position illustrated by a solid line in FIG. 21. The pressing mechanism 120 may be configured to include at least one of a gear, a cam, an actuator, a spring, a motor, and the like. The pressing mechanism 120 may be configured to move the first coupling member 118 and the second coupling member 119 in an interlocking manner with the movement of the printing unit 21. The pressing mechanism 120 may be configured to move the first coupling member 118 and the second coupling member 119 by being controlled by a control unit 37.

The coupling position is a position at which an air cooling path 57 and a ventilation path 64 are coupled to each other. The first coupling member 118 positioned at the coupling position couples the printing unit 21 positioned at a printing position Pp and the cooling mechanism 39 to each other. The second coupling member 119 positioned at the coupling position couples the printing unit 21 positioned at a maintenance position Pm and the cooling mechanism 39 to each other.

The closed position is a position away from the printing unit 21. The closed position may be a position at which the ventilation path 64 is closed. In the present embodiment, the first coupling member 118 and the second coupling member 119 may function as a shutter respectively.

The first coupling member 118 positioned at the closed position may be configured to restrict flow of air passing through the first air hole 41 by closing between the first air hole 41 and the fan 62. That is, the first coupling member 118 may be configured to close the first air hole 41 by being positioned at the closed position.

The second coupling member 119 positioned at the closed position may be configured to restrict flow of air passing through the second air hole 42 by closing between the second air hole 42 and the fan 62. That is, the second coupling member 119 may be configured to close the second air hole 42 by being positioned at the closed position.

The manner of operation of the present embodiment is described.

When the printing unit 21 is positioned at the printing position Pp, the pressing mechanism 120 positions the first coupling member 118 at the coupling position. That is, the air cooling path 57 is coupled to the first air hole 41 by way of the first coupling member 118. Then, the pressing mechanism 120 positions the second coupling member 119 at the closed position. When the fan 62 is driven, air flows in the air cooling path 57 from the suction hole 59, and the air is fed from the air cooling path 57 to the ventilation path 64 by way of the first coupling member 118.

When the printing unit 21 is positioned at the maintenance position Pm, the pressing mechanism 120 positions the second coupling member 119 at the coupling position. That is, the air cooling path 57 is coupled to the second air hole 42 by way of the second coupling member 119. Then, the pressing mechanism 120 positions the first coupling member 118 at the closed position. When the fan 62 is driven, air flows in the air cooling path 57 from the suction hole 59, and the air is fed from the air cooling path 57 to the ventilation path 64 by way of the second coupling member 119.

Advantageous effects of the present embodiment are described.

(20) The pressing mechanism 120 presses the first coupling member 118 and the second coupling member 119 to the printing unit 21. Accordingly, a sealing property between the first coupling member 118 and the second coupling member 119 and the printing unit 21 can be increased.

The present embodiment can be implemented with the following modifications. The present embodiment and modified examples thereof described hereinafter can be implemented in combination within a range where technical contradiction does not occur.

In the second embodiment described above, the interlocking mechanism 40 may be configured to transmit power using a wire instead of using the belt 76.

In the second embodiment described above, the belt 76 may not have an annular shape. That is, the first transmission portion 70 may be fixed to one end of the belt 76, the belt 76 may be wound around the first driven pulley 77, and the second transmission portion 74 may be fixed to the other end of the belt 76. In this case, the interlocking mechanism 40 may not include the second driven pulley 78. When the printing unit 21 moves the second hook 47 in the moving direction Dm, the shutter 61 may move in a direction opposite to the moving direction Dm due to its own weight. When the printing unit 21 moves the first hook 46 in a direction opposite the moving direction Dm, the shutter 61 may move in the moving direction Dm so as to be pulled up by the belt 76.

The rail 49 may be formed in a curved shape. The moving direction Dm may be a direction extending along the curved rail.

The fan 62 may be provided to the printing unit 21. For example, the fan 62 may be provided to any one of the air cooling path 57, the suction hole 59, and the coupling hole 58.

The signal generation circuit 54 may be provided separately from the liquid ejecting head 19.

The interlocking mechanism 40 may be provided outside the duct 43.

The liquid ejecting device 11 may not include the interlocking mechanism 40. For example, the liquid ejecting device 11 may include a drive unit for moving the shutter 61. The control unit 37 may be configured to move the shutter 61 by controlling driving of the drive unit, in accordance with the movement of the printing unit 21.

The fan 62 may be configured to cause air in the air cooling path 57 to flow at the same flow rate regardless of a position of the printing unit 21.

The fan 62 may be configured to continue operation also while the printing unit 21 is moving.

The fan 62 may be configured to feed air to the ventilation path 64. In this case, air flows in the air cooling path 57 from the ventilation path 64, and cools the liquid ejecting head 19.

A distance between the fan 62 and the first air hole 41 may be equal to or longer than a distance between the fan 62 and the second air hole 42.

The shutter 61 may be configured to move to the first position P1 at which the second wall 67 closes the first air hole 41 and the position at which the second wall 67 closes the second air hole 42.

The liquid ejecting device 11 may be configured to include a plurality of the shutters 61. For example, the liquid ejecting device 11 may include a first shutter capable of opening and closing the first air hole 41 and a second shutter capable of opening and closing the second air hole 42.

The shutter 61 may be provided outside the duct 43. When the liquid ejecting device 11 includes the plurality of shutters 61, each shutter 61 may be configured to open and close the first air hole 41 and the second air hole 42 by moving in a direction different from the moving direction Dm.

The printing unit 21 may be configured to move to a position different from the printing position Pp and the maintenance position Pm. In that case, the cooling mechanism 39 may include a duct 43 in which an air hole corresponding to the different position is formed.

The printing unit 21 may be configured to move to a plurality of maintenance positions Pm. Specifically, the printing unit 21 may be movable to a capping position at which capping by the cap is performed, a wiping position at which wiping by the wiper is performed, a flushing position at which flushing is performed, and the like. In this case, the cooling mechanism 39 may include the duct 43 in which air holes respectively corresponding to the capping position, the wiping position, the flushing position, and the like are formed.

In the third embodiment described above, the pressing member 104 may be constituted of an elastic member such as a rubber, a sponge, or a leaf spring. The pressing member 104 may be provided outside the coupling member 103. For example, the pressing member 104 may be configured to push the flange 111.

In the third embodiment described above, the first surface 106, the second surface 107, and the intermediate surface 108 may be coplanar with each other. The first distance D1, the second distance D2, and the third distance D3 may be equal to each other.

In the third embodiment described above, the second surface 107 and the intermediate surface 108 may be coplanar with each other. The second distance D2 and the third distance D3 may be equal to each other. The first distance D1 may be smaller than the second distance D2 and the third distance D3.

In the third embodiment described above, an inner dimension of the coupling member 103 may be set larger than an outer dimension of the second holder 20*s*. The coupling member 103 may be attached to cover the second holder 20*s*.

In the third embodiment described above, the coupling member 103 may be formed of a member having elasticity such as a resin sheet, for example. In this case, the coupling member 103 may be fixed to the second holder 20*s*. The coupling member 103 may adhere to the cooling mechanism 39 due to its elasticity.

In the third embodiment described above, the movement mechanism 22 and the power transmission mechanism 100 may each include a clutch. The movement mechanism 22 and the power transmission mechanism 100 may be configured to move the printing unit 21 and the shutter 61 at different timings.

In the fourth embodiment described above, the liquid ejecting device 11 may be configured to include one of the first coupling member 118 and the second coupling member 119.

In the fourth embodiment described above, the liquid ejecting device 11 may include a plurality of the pressing mechanisms 120. For example, the liquid ejecting device 11 may include a pressing mechanism 120 configured to move the first coupling member 118 and a pressing mechanism 120 configured to move the second coupling member 119, separately.

The liquid ejecting device 11 may be a liquid ejecting device configured to jet or eject other liquids other than ink. A state of the liquid ejected from the liquid ejecting device in the form of a droplet having an extremely small amount includes a particulate shape, a tear drop shape, or a stringy shape. In this specification, it is sufficient for the liquid to be made of a material that can be ejected from the liquid ejecting device. For example, a liquid may be a material in a liquid phase state. The liquid includes a liquid body having high or low viscosity, sol, gel water, and other fluid bodies such as an inorganic solvent, an organic solvent, a solution, a liquid resin, liquid metal, a metal melt. As the liquid, not only liquid that is one phase of a substance, but also liquid that is produced by dissolving, dispersing, or mixing particles of a functional material made of a solid substance such as pigments or metal particles in a solvent is also included. As representative examples of the liquid, inks as described in the above-mentioned embodiments, liquid crystals, and the like can be named. Here, the ink includes various liquid compositions such as a general aqueous ink, an oil-based ink, a gel ink, a hot-melt ink, and the like. For example, as a specific example of the liquid ejecting device, there is a device configured to eject liquid containing materials such as an electrode material and a color material used for the manufacture or the like of a liquid crystal display, an electroluminescent display, a surface emitting display, and a color filter in a dispersed or dissolved manner. The liquid ejecting device may also be a device configured to eject bio-organic substances used for the manufacture of biochips, a device used as a precision pipette and configured to eject liquid as a specimen, a fabric printing apparatus, a micro dispenser, or the like. The liquid ejecting device may also be a device configured to eject a lubricant to a precision machine such as a clock or a camera in a pinpoint manner, and a device configured to eject a transparent resin liquid such as an ultraviolet curing resin or the like on a substrate for forming a tiny hemispherical lens, an optical lens, or the like used for an optical communication element and the like. The liquid ejecting device may also be a device configured to eject an acid or alkaline etching solution for etching a substrate or the like.

Hereinafter, technical concepts and advantageous effects thereof that are understood from the above-described embodiments and modified examples are described.

(A) A liquid ejecting device includes: a printing unit including a liquid ejecting head configured to eject a liquid to a medium and a head holder configured to form an air cooling path, and a cooling mechanism configured to cause air in the air cooling path to flow therethrough to air-cool the liquid ejecting head, wherein the printing unit is provided so as to be movable with respect to a transport path along which the medium is transported, the cooling mechanism includes a first air hole and a second air hole that are configured to be coupled to the air cooling path, and the air cooling path is coupled to one of the first air hole and the second air hole corresponding to a position of the printing unit.

According to such a configuration, the air cooling path is coupled to one of the first air hole and the second air hole corresponding to a position of the printing unit. That is, when the printing unit is positioned at a position corresponding to the first air hole, the air cooling path is coupled to the first air hole. When the printing unit is positioned at a position corresponding to the second air hole, the air cooling path is coupled to the second air hole. The cooling mechanism is configured to cause air in the air cooling path to flow through one of the first air hole and the second air hole to which the air cooling path is coupled. Accordingly, the cooling mechanism can cool the moving liquid ejecting head.

(B) In the liquid ejecting device, the printing unit may be configured to move to a printing position at which printing is performed on the medium and a maintenance position at which maintenance is performed, and when the printing unit is positioned at the printing position, the first air hole may be coupled to the air cooling path, and when the printing unit is positioned at the maintenance position, the second air hole may be coupled to the air cooling path.

According to such a configuration, the first air hole is coupled to the air cooling path when the printing unit is positioned at the printing position. The second air hole is coupled to the air cooling path when the printing unit is positioned at the maintenance position. Accordingly, the cooling mechanism can cool the liquid ejecting head positioned at the printing position and the maintenance position.

(C) In the liquid ejecting device, the cooling mechanism may include a duct in which the first air hole and the second air hole are formed, and a shutter configured to close the first air hole and the second air hole, and when the first air hole is coupled to the air cooling path, the shutter may close the second air hole, and when the second air hole is coupled to the air cooling path, the shutter may close the first air hole.

According to such a configuration, one of the first air hole and the second air hole is coupled to the air cooling path, and the other is closed by the shutter. Accordingly, leakage of air from the air hole that is not coupled to the air cooling path can be suppressed.

(D) In the liquid ejecting device, the air cooling path may be configured to couple a suction hole for sucking outside air and a coupling hole coupled to the first air hole or the second air hole to each other, the cooling mechanism may include a fan configured to suck air from the air cooling path, and a distance between the fan and the first air hole may be set shorter than a distance between the fan and the second air hole.

According to such a configuration, the cooling mechanism includes the fan configured to suck air from the air cooling path. That is, the fan cools the liquid ejecting head by causing air taken in the air cooling path from the suction hole to flow. The printing unit positioned at the printing position and performing printing is liable to generate heat compared to a case where the printing unit is positioned at the maintenance position and maintenance of printing unit is performed. In this respect, the fan is disposed at a position closer to the first air hole than the second air hole. Accordingly, the printing unit that is positioned at the printing position and is coupled to the first air hole can be cooled more efficiently compared to a case where the printing unit is positioned at the maintenance position and is coupled to the second air hole.

(E) In the liquid ejecting device, the fan may be configured to stop operation thereof while the printing unit is moving.

There is a case where mist, that is misty liquid, floats around the liquid ejecting head. When air is sucked from the first air hole and the second air hole, there is a concern that mist is sucked together with the air. In this respect, according to such a configuration, the fan stops operation while the printing unit is moving. That is, since the fan stops operation until the air cooling path is coupled to one of the first air hole and the second air hole, and the shutter closes the other of the first air hole and the second air hole, the concern that mist is sucked from the first air hole and the second air hole can be reduced.

(F) In the liquid ejecting device, the fan may be configured to cause air in the air cooling path to flow at a first flow rate when the first air hole is coupled to the air cooling path, and to cause air in the air cooling path to flow at a second flow rate when the second air hole is coupled to the air cooling path, and the first flow rate may be set faster than the second flow rate.

According to such a configuration, the air cooling path is coupled to the first air hole when the printing unit is positioned at the printing position, and is coupled to the second air hole when the printing unit is positioned at the maintenance position. When the printing unit is positioned at the printing position, the fan causes air in the air cooling path to flow at a speed faster than a speed in a case where the printing unit is positioned at the maintenance position. Accordingly, the printing unit positioned at the printing position can be efficiently cooled.

(G) The liquid ejecting device may further include an interlocking mechanism configured to move the shutter in an interlocking manner with the movement of the printing unit.

According to such a configuration, the movement of the printing unit and the movement of the shutter are interlocked with each other by the interlocking mechanism. Accordingly, it is possible to reduce time and efforts for a user compared to a case where the user moves the shutter, for example.

(H) In the liquid ejecting device, the interlocking mechanism may include a first rack configured to move together with the printing unit, a second rack configured to move together with the shutter, and a pinion configured to mesh with the first rack and the second rack, and the shutter may be configured to move in a direction opposite to a direction in which the printing unit moves.

According to such a configuration, the interlocking mechanism includes the first rack and the second rack that are configured to mesh with one pinion. When the first rack moves, the second rack moves in a direction opposite to a direction in which the first rack moves. Accordingly, the printing unit provided with the first rack and the shutter provided with the second rack can be moved in directions opposite to each other with the simple configuration.

(I) In the liquid ejecting device, the interlocking mechanism may include a belt configured to couple the printing unit and the shutter to each other, and the belt may be configured to transmit, to the shutter, power for moving the printing unit, and to move the shutter in a direction opposite to a direction in which the printing unit moves.

According to such a configuration, the movement mechanism transfers the power for moving the printing unit to the shutter by the belt. By using the deformable belt, the degree of freedom in arrangement of the movement mechanism can be enhanced.

(J) In the liquid ejecting device, at least a portion of the interlocking mechanism may be disposed in the duct.

According to such a configuration, at least a portion of the interlocking mechanism is disposed in the duct. Accordingly, a space occupied by the interlocking mechanism can be reduced compared to a case where the whole interlocking mechanism is disposed outside the duct.

(K) The liquid ejecting device may include a driving source, a movement mechanism configured to transmit power of the driving source to the printing unit to move the printing unit, and a power transmission mechanism configured to transmit power of the driving source to the shutter to move the shutter.

According to such a configuration, power of the driving source is transmitted to the printing unit by the movement mechanism and is transmitted to the shutter by the power transmission mechanism. Accordingly, a load applied to the printing unit can be reduced compared to a case where power is transmitted to the shutter by way of the printing unit, for example.

(L) In the liquid ejecting device, the liquid ejecting head may have a drive element driven for ejecting the liquid, and a signal generation circuit configured to generate a drive waveform signal to be applied to the drive element.

According to such a configuration, the liquid ejecting head includes the drive element and the signal generation circuit. Accordingly, a distance between the drive element and the signal generation circuit can be made short compared to a case where the signal generation circuit is provided separately from the printing unit, for example.

(M) The liquid ejecting device may further include a coupling member configured to couple the printing unit and the cooling mechanism to each other, and the air cooling path may be coupled to the first air hole and the second air hole by way of the coupling member.

When positional accuracy between the printing unit having the air cooling path and the cooling mechanism having the first air hole and the second air hole is low, there is a concern that air is leaked from between the printing unit and the cooling mechanism. In this respect, according to such a configuration, the air cooling path is coupled to the first air hole or the second air hole by way of the coupling member. Accordingly, even when the positional accuracy between the cooling mechanism and the printing unit is low, such a low positional accuracy can be compensated by the coupling member thus easily reducing leakage of air.

(N) The liquid ejecting device may further include a pressing member configured to press the coupling member to the cooling mechanism.

According to such a configuration, the pressing member presses the coupling member to the cooling mechanism.

Accordingly, a sealing property between the coupling member and the cooling mechanism can be increased.

(O) In the liquid ejecting device, the cooling mechanism may include a first surface disposed around the first air hole, a second surface disposed around the second air hole, and an intermediate surface disposed between the first surface and the second surface, and, in a pressing direction in which the pressing member presses the coupling member, a distance between the first surface and the head holder may be smaller than a distance between the intermediate surface and the head holder.

According to such a configuration, the distance between the first surface and the head holder is smaller than the distance between the intermediate surface and the head holder. Therefore, the pressing member presses the coupling member to the first surface with a force larger than a force of pressing the coupling member to the intermediate surface. Accordingly, a sealing property between the coupling member and the first surface can be increased.

(P) In the liquid ejecting device, the coupling member may be detachably provided to the head holder.

According to such a configuration, the coupling member is provided to the head holder. Accordingly, the coupling member can be moved together with the printing unit, and a coupling destination of the air cooling path can be easily switched. Since the coupling member is detachable, it is possible to easily perform maintenance of the coupling member and the printing unit.

(Q) The liquid ejecting device may further include a pressing mechanism configured to press the coupling member to the printing unit.

According to such a configuration, the pressing mechanism presses the coupling member to the printing unit. Accordingly, a sealing property between the coupling member and the printing unit can be increased.

What is claimed is:

1. A liquid ejecting device comprising:

a printing unit including a liquid ejecting head configured to eject a liquid to a medium, and a head holder configured to form an air cooling path; and a cooling mechanism configured to cause air in the air cooling path to flow therethrough to air-cool the liquid ejecting head, wherein the printing unit is provided so as to be movable with respect to a transport path along which the medium is transported, the movement direction being perpendicular to a nozzle surface of the liquid ejecting head, the cooling mechanism includes a first air hole and a second air hole that are configured to be coupled to the air cooling path, and as the printing unit moves in the movement direction, whether the air cooling path is coupled to the first air hole or the second air hole is switched.

2. The liquid ejecting device according to claim 1, wherein the printing unit is configured to move to a printing position at which printing is performed on the medium and a maintenance position at which maintenance is performed, and when the printing unit is positioned at the printing position, the first air hole is coupled to the air cooling path, and when the printing unit is positioned at the maintenance position, the second air hole is coupled to the air cooling path.

3. The liquid ejecting device according to claim 1, wherein the cooling mechanism includes:

a duct in which the first air hole and the second air hole are formed; and a shutter configured to close the first air hole and the second air hole, and when the first air hole is coupled to the air cooling path, the shutter closes the second air hole, and when the second air hole is coupled to the air cooling path, the shutter closes the first air hole.

4. The liquid ejecting device according to claim 3, wherein the air cooling path is configured to couple a suction hole for sucking outside air and a coupling hole coupled to the first air hole or the second air hole to each other, the cooling mechanism includes a fan configured to suck air from the air cooling path, and a distance between the fan and the first air hole is set shorter than a distance between the fan and the second air hole.

5. The liquid ejecting device according to claim 4, wherein the fan is configured to stop operation thereof while the printing unit is moving.

6. The liquid ejecting device according to claim 4, wherein the fan is configured to cause air in the air cooling path to flow at a first flow rate when the first air hole is coupled to the air cooling path, and cause air in the air cooling path to flow at a second flow rate when the second air hole is coupled to the air cooling path, and the first flow rate is faster than the second flow rate.

7. The liquid ejecting device according to claim 3, further comprising an interlocking mechanism configured to move the shutter in an interlocking manner with movement of the printing unit.

8. The liquid ejecting device according to claim 7, wherein the interlocking mechanism includes:

a first rack configured to move together with the printing unit;

a second rack configured to move together with the shutter; and a pinion configured to mesh with the first rack and the second rack, and the shutter is configured to move in a direction opposite to a direction in which the printing unit moves.

9. The liquid ejecting device according to claim 7, wherein the interlocking mechanism includes a belt configured to couple the printing unit and the shutter to each other, and the belt is configured to transmit, to the shutter, power for moving the printing unit, and to move the shutter in a direction opposite to a direction in which the printing unit moves.

10. The liquid ejecting device according to claim 7, wherein at least a portion of the interlocking mechanism is provided in the duct.

11. The liquid ejecting device according to claim 3, comprising:

a driving source;

a movement mechanism configured to transmit power of the driving source to the printing unit to move the printing unit; and a power transmission mechanism configured to transmit power of the driving source to the shutter to move the shutter.

12. The liquid ejecting device according to claim 1, wherein the liquid ejecting head includes:

a drive element driven for ejecting the liquid; and a signal generation circuit configured to generate a drive waveform signal to be applied to the drive element.

13. The liquid ejecting device according to claim 1, further comprising:

a coupling member configured to couple the printing unit and the cooling mechanism to each other, wherein the air cooling path is coupled to the first air hole and the second air hole by way of the coupling member.

14. The liquid ejecting device according to claim 13, further comprising a pressing member configured to press the coupling member to the cooling mechanism.

15. The liquid ejecting device according to claim 14, wherein the cooling mechanism includes:

a first surface disposed around the first air hole;

a second surface disposed around the second air hole; and an intermediate surface disposed between the first surface and the second surface, and in a pressing direction in which the pressing member presses the coupling member, a distance between the first surface and the head holder is smaller than a distance between the intermediate surface and the head holder.

16. The liquid ejecting device according to claim 13, wherein the coupling member is detachably provided to the head holder.

17. The liquid ejecting device according to claim 13, further comprising a pressing mechanism configured to press the coupling member to the printing unit.

18. The liquid ejecting device according to claim 1, wherein the first air hole and the second air hole are provided at different positions in the movement direction.

19. A liquid ejecting device comprising:

a printing unit including a liquid ejecting head configured to eject a liquid to a medium, and a head holder configured to form an air cooling path; and a cooling mechanism configured to cause air in the air cooling path to flow therethrough to air-cool the liquid ejecting head, wherein the printing unit is provided so as to be movable with respect to a transport path along which the medium is transported, the cooling mechanism includes a first air hole and a second air hole that are configured to be coupled to the air cooling path, the air cooling path is coupled to one of the first air hole and the second air hole corresponding to a position of the printing unit, the cooling mechanism includes:

a duct in which the first air hole and the second air hole are formed; and a shutter configured to close the first air hole and the second air hole, and when the first air hole is coupled to the air cooling path, the shutter closes the second air hole, and when the second air hole is coupled to the air cooling path, the shutter closes the first air hole.

* * * * *